United States Patent [19]

Duckwall et al.

[11] Patent Number: 5,935,208
[45] Date of Patent: Aug. 10, 1999

[54] INCREMENTAL BUS RECONFIGURATION WITHOUT BUS RESETS

[75] Inventors: William S. Duckwall; Michael D. Teener, both of Santa Cruz, Calif.

[73] Assignee: Apple Computer, Inc., Cupertino, Calif.

[21] Appl. No.: 09/186,921

[22] Filed: Nov. 6, 1998

Related U.S. Application Data

[62] Division of application No. 08/889,814, Jul. 8, 1997, Pat. No. 5,875,301, which is a continuation of application No. 08/359,294, Dec. 19, 1994, abandoned.

[51] Int. Cl.[6] .................................................. G06F 13/00
[52] U.S. Cl. ........................ 709/221; 710/10; 710/104
[58] Field of Search .............................. 712/1; 709/221, 709/220, 200, 223, 249, 250; 710/8, 10, 13, 15, 103, 65, 104, 110, 129; 714/7, 13, 820, 821; 370/229, 254, 351

[56] References Cited

U.S. PATENT DOCUMENTS

| | | | |
|---|---|---|---|
| 4,845,744 | 7/1989 | DeBenedictis | 379/221 |
| 4,860,201 | 8/1989 | Stolfo et al. | 395/800 |
| 5,018,139 | 5/1991 | Despres | 370/94.3 |
| 5,199,106 | 3/1993 | Bourke et al. | 395/290 |
| 5,263,163 | 11/1993 | Holt et al. | 395/730 |
| 5,317,693 | 5/1994 | Cuenod et al. | 395/829 |
| 5,386,567 | 1/1995 | Lien et al. | 395/653 |
| 5,394,556 | 2/1995 | Oprescu | 395/800 |
| 5,457,784 | 10/1995 | Wells et al. | 395/829 |
| 5,548,567 | 8/1996 | Sawai | 369/36 |
| 5,548,712 | 8/1996 | Larson et al. | 395/182.05 |
| 5,805,834 | 9/1998 | McKinley et al. | 395/283 |

OTHER PUBLICATIONS

Oprescu, Florin, "Internet Document Id # 9409300114.AA20843," Sep. 29, 1994, pp. 1–2.
Oprescu, Florin, "Internet Document Id # 9410041815.AA06083," Oct. 4, 1994, pp. 1–3.
Oprescu, Florin, "Internet Document Id # 9410050239.AA08832,"Oct. 4, 1994, pp. 1–2.
Blackledge, Larry, "Internet Document Id # 9410051435.AA09386," Oct. 5, 1994, pp. 1–2.
Wetzel, Alan, "Internet Document Id # 9410141450.AA06885," Oct. 14, 1994, pp. 1–2.
Oprescu, Florin, "Internet Document Id # 9410142335.AA24089," Oct. 14, 1994, pp. 1–3.

*Primary Examiner*—Larry D. Donaghue
*Attorney, Agent, or Firm*—Blakely, Sokoloff, Taylor & Zafman

[57] ABSTRACT

An electronic system interconnect. The interconnect comprises a first node and a second node coupled to the first node. The interconnect is initially configured to include the first and second nodes. A third node is added to the interconnect after the interconnect is initially configured, and the first node responds to the addition of the third node by initiating a new connect handshake with the third node. The first node begins by transmitting a first signal to the third node. The first node signals that the third node has been added to the interconnect if the third node responds to the first signal by transmitting a second signal. The first node causes the interconnect to be reconfigured if the third node transmits a third signal in response to receiving the first signal.

3 Claims, 25 Drawing Sheets

INCREMENTAL BUS RECONFIGURATION WITHOUT BUS RESETS

This is a division of application Ser. No. 08/889,814, filed Jul. 8, 1997, now U.S. Pat. No. 5,875,301 which is a continuation of application Ser. No. 08/359,294, filed Dec. 19, 1994, now abandoned.

FIELD OF THE INVENTION

The present invention relates generally to data communications and more particularly to the addition and subtraction of nodes to a common interconnect.

BACKGROUND OF THE INVENTION

Digital electronic systems such as computer systems often use a common interconnect to share information between components of the digital electronic system. For computer systems, the interconnect is typically the computer bus.

One type of system interconnect is described by IEEE Standards document P1394, Draft 7.1v1, entitled *IEEE Standard for a High Performance Serial Bus* (hereafter the "P1394 serial bus standard"). A typical serial bus having the P1394 standard architecture is comprised of a multiplicity of nodes that are interconnected via point-to-point links such as cables that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once.

The P1394 serial bus standard provides for an arbitrary bus topology wherein the hierarchical relationship between nodes of the serial bus is determined by the manner in which the nodes are connected to one another. A P1394 serial bus is configured in three phases: bus initialization, tree identification, and self identification. During bus initialization, the general topology information of the serial bus is identified according to a tree metaphor. For example, each node is identified as being either a "branch" having more than one directly connected neighbor node or a "leaf" having only one neighbor node. During tree identification, hierarchical relationships are established between the nodes. For example, one node is designated a "root" node, and the hierarchy of the remaining nodes is established with respect to the relative nearness of a node to the root node. Given two nodes that are connected to one another, the node connected closer to the root is the "parent" node, and the node connected farther from the root is the "child." Nodes connected to the root are children of the root. During self identification, each node is assigned a bus address and a topology map may be built for the serial bus.

According to the P1394 serial bus standard, reconfiguration of a serial bus is required when either 1) a new node is joined to the serial bus, or 2) an identified node of the serial bus is removed from the serial bus. Reconfiguration is required to better ensure that all nodes of the serial bus are notified of the newly connected or disconnected node and that each node has a unique bus address. Typically, the node of the serial bus that detects a new connection or disconnection forces the three phase configuration to be performed by asserting a bus reset signal. The three phase configuration process typically requires several hundred microseconds to perform, during which time communications of data between nodes is halted. Such long periods of interruption may significantly affect the operation of the system for some uses of the serial bus. Therefore, it would be desirable to provide a mechanism that allows the connection and disconnection of nodes from the serial bus such that interruptions to serial bus traffic are reduced.

SUMMARY OF THE INVENTION

An electronic system interconnect is described that comprises a first node and a second node coupled to the first node and that allows for the addition of nodes to the interconnect after the interconnect is initially configured. The interconnect is initially configured to include the first and second nodes. A third node is added to the interconnect after the interconnect is initially configured, and the first node responds to the addition of the third node by initiating a new connect handshake with the third node. The first node begins by transmitting a first signal to the third node. The first node signals that the third node has been added to the interconnect if the third node responds to the first signal by transmitting a second signal. The first node causes the interconnect to be reconfigured if the third node transmits a third signal in response to receiving the first signal. According to one embodiment, the electronic system interconnect is a serial bus, and the first node signals the addition of the third node after arbitrating for the serial bus. The use of normal bus arbitration to signal the addition of nodes to the serial bus reduces interruptions of bus traffic.

A method for building a topology map of a serial bus without requiring a bus reset is also disclosed. A bus topology manager node of the serial bus transmits a SEND_SELF_ID packet to a first node. The first node receives the SEND_SELF_ID packet and responds by transmitting a SELF_ID packet of the first node to the bus topology manager node. A parent node of the first node responds to the SELF_ID packet of the first node by transmitting its own SELF_ID packet. The bus topology manager node is thus able to build a bus topology map without requiring a bus reset.

BRIEF DESCRIPTION OF THE DRAWINGS

The present invention is illustrated by way of example and not limitation in the figures of the accompanying drawings, in which like references indicate similar elements, and in which:

FIG. 18A shows the first quadlet of a PHY configuration packet according to the P1394 serial bus standard.

FIG. 18B shows a NODE_ADDED_ALERT packet.

FIG. 18C shows a SET_ADDRESS packet.

FIG. 18D shows a NODE_DETACHED_ALERT packet.

FIG. 18E shows a SEND_SELF_ID packet.

DETAILED DESCRIPTION

As described herein, nodes may be connected to or disconnected from an existing, configured serial bus in an incremental manner without undertaking the three-phase bus configuration process required by the P1394 serial bus standard. Thus, nodes may be added to a serial bus such that interruptions of bus traffic are reduced. Also described herein is a mechanism whereby the bus topology manager of a serial bus may build a topology map for a previously configured serial bus without undertaking the three-phase bus configuration process. Although the embodiments of the claimed inventions are described with reference to a serial bus, the claimed inventions may find application in any interconnect architecture having an arbitrary topology wherein the hierarchical relationship between nodes of the interconnect is determined by the manner in which the nodes are connected to form the interconnect.

Figure 1:
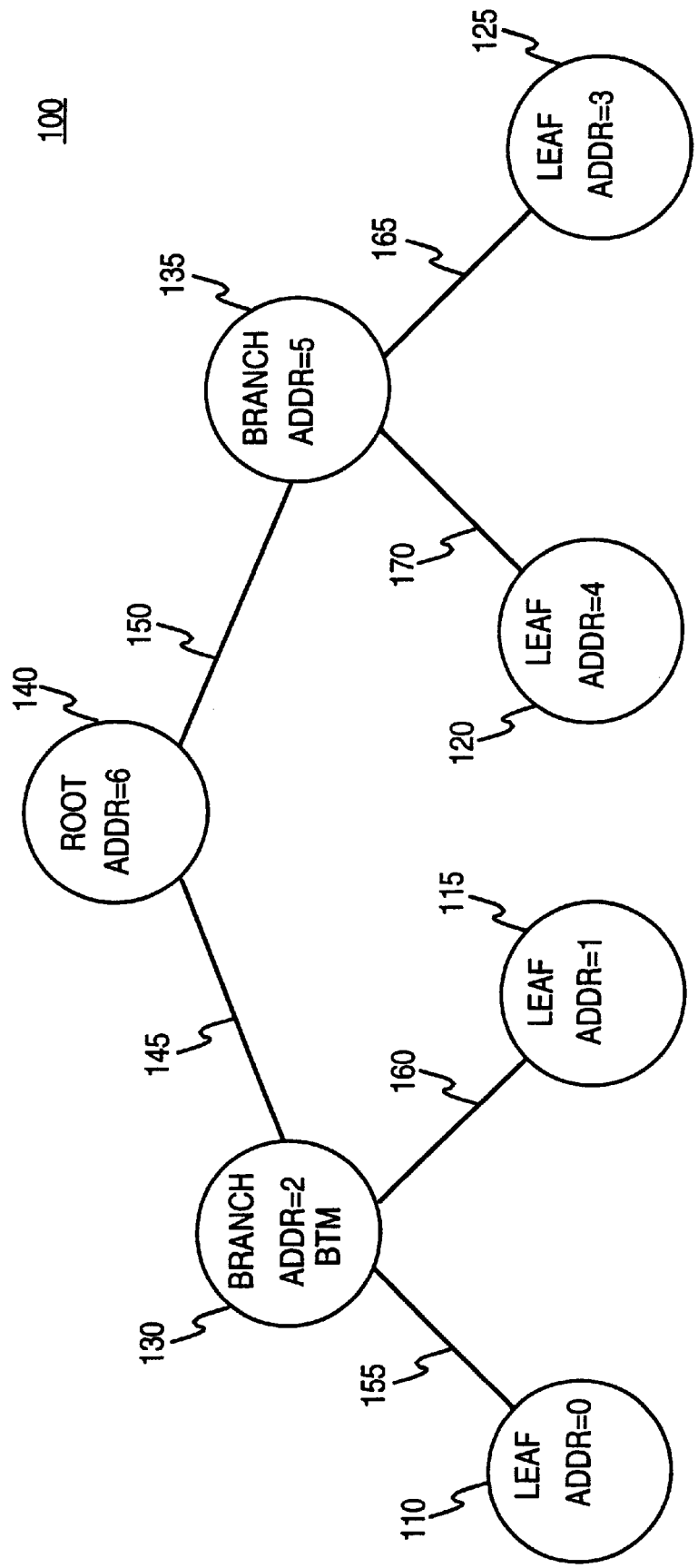
FIG. 1 shows a serial bus according to one embodiment.

FIG. 1 shows a configured serial bus wherein at least one of the nodes of the serial bus includes circuitry for adding and removing nodes from the serial bus without requiring a bus reset. Serial bus 100 includes nodes 110–140 and cables 145–170, wherein cable 145 couples node 140 to node 130, cable 150 couples node 140 to node 135, cable 155 couples node 130 to node 110, cable 160 couples node 130 to node 115, cable 165 couples node 135 to node 125, and cable 170 couples node 135 to node 120.

Each of the nodes 110–140 is typically associated with a "local host," which is a component of the electronic system for which the serial bus acts as a primary or complimentary interconnect. The serial bus 100 may generally operate as specified by the P1394 serial bus standard, wherein each of the nodes 110–140 includes at least one port, and each of the cables 145–170 includes two pairs of differential signal lines and a pair of power lines. Each connected port is implied by the connection between a cable and a node.

During the initialization phase of the bus configuration process, nodes 110–125 are identified as leaf nodes, and nodes 130–140 are identified as branch nodes. Each node identifies itself as either a leaf or a branch in response to the number of connected ports that are detected. During the tree identification phase of the bus configuration process, node 140 is identified as the root node. During the self-identification phase of the configuration process, each node is assigned a bus address, wherein the root node is typically assigned the largest valid bus address. For example, node 110 is assigned address 0, node 115 is assigned address 1, node 130 is assigned address 2, node 125 is assigned address 3, node 120 is assigned address 4, node 135 is assigned address 5, and root node 140 is assigned address 6. Bus arbitration may begin once a serial bus has successfully completed the bus configuration process.

A serial bus may be provided with a bus topology manager ("BTM") that undertakes various bus management tasks. Typically, any node of the serial bus may be the BTM, and node 130 is identified as the BTM for serial bus 100. Among other tasks, BTM node 130 is responsible for maintaining a topology map for the serial bus 100 that identifies the relationships between each of the nodes and the bus address for each node.

Figure 2:
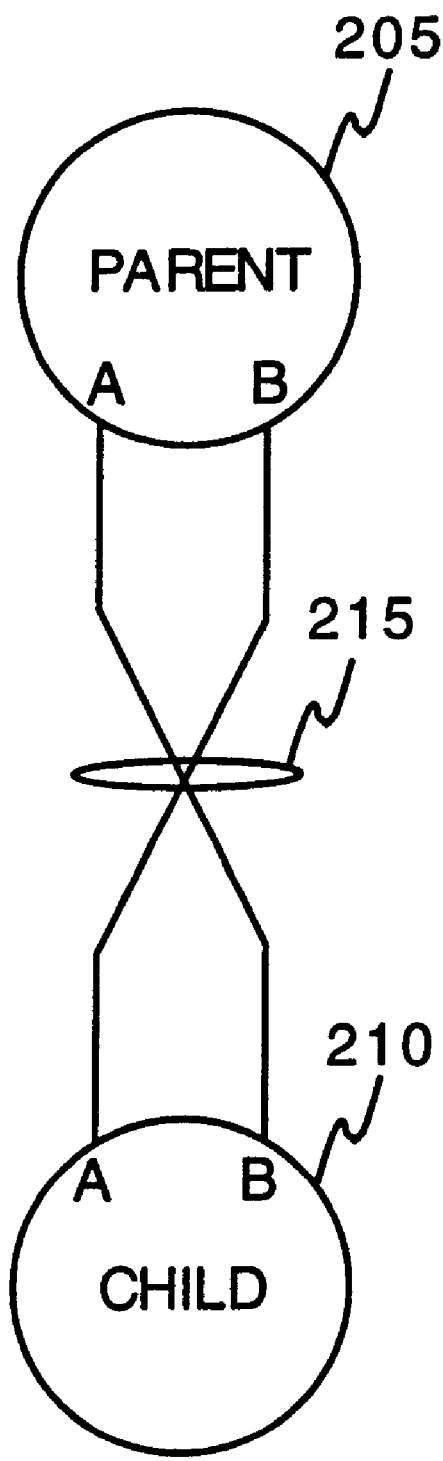
FIG. 2 shows a pair of differential signal lines for a cable.

FIG. 2 illustrates the mechanism whereby a node of the serial bus is able to detect whether a particular port of that node is connected to another node of the serial bus. This mechanism is used by a node during the bus initialization phase of the bus configuration process to determine whether that node is a leaf node or a branch node.

As shown, a parent node 205 is coupled to a child node 210 via cable 215, which is shown as including a pair of differential signal lines. Again, the interconnected ports of the parent and child nodes are implied by the connection of the cable 215 to the respective nodes. As shown, each of the ports for each node is divided into an "A" side and a "B" side, wherein each of the A and B sides of each port includes a transceiver that is connected to one of the pair of signal lines.

When connected, the signal lines of the cable 215 may be in a "1" state, a "0" state, and a "Z" state, wherein the 1 state dominates the 0 state, which dominates the Z state. During arbitration, both nodes may drive the signal lines simultaneously, and each node interprets the state of a signal line by comparing the value that node is driving on the signal line to the value that node is receiving on the signal line. Table 1 shows the decoding for arbitration signal lines according to the P1394 serial bus standard.

TABLE 1

| Arbitration Signal Decoding Rules | | |
|---|---|---|
| Received Value | Transmitted Value | Interpreted Value |
| Z | Z | Z |
| 0 | Z | 0 |
| 1 | Z | 1 |
| Z | 0 | 1 |
| 0 | 0 | 0 |
| Z | 1 | 1 |
| 1 | 1 | 1 |

As shown in FIG. 2, cable 215 provides a connection between the ports of the parent and child nodes such that the A side of the parent port is coupled to the B side of the child port, and the B side of the parent port is coupled to the A side of the child port. For each port, the A side transceiver provides a common mode biasing voltage to a connected differential signal line, and the B side transceiver includes circuitry for detecting the common mode biasing voltage. If the B side transceiver of a port detects a biasing voltage, the node identifies that port as being connected to another node. If the B side transceiver of a port does not detect a biasing voltage, the node identifies that port as not being connected to another node. If the state of a port changes from connected to disconnected, or vice versa, after the configuration process has completed, the P1394 serial bus standard requires a bus reset.

For some cases, the connection or disconnection of a node may be detected without physically connecting or disconnecting a node from the serial bus. For example, it may be desirable for the nodes of the serial bus to draw power from a source other than the cables of the serial bus, such as a node's local host. However, one reason for specifying that the nodes of the serial bus draw power from the cables is that a node may remain powered up even when its associated local host is powered down. The function of supplying the biasing voltage requires power, and if the local host of a node that draws power from the local host is switched off, the biasing voltage will be removed from each of the nodes connected ports, and a "disconnection" is detected even though the node remains physically connected to the serial bus. Similarly, a new "connection" may be detected when a node that draws power from its local host is powered on.

Therefore, a new connection may be detected when a new node is initially physically connected to the serial bus, or when an already connected node that is not powered by the cable is switched on. A disconnection may be similarly detected. As described above, the P1394 serial bus standard specifies that if a node detects a new connection or disconnection after the bus configuration process, that node will force a bus reset. The incremental addition process described herein accounts for both types of connections and disconnections, providing for the addition and removal of nodes without requiring a bus reset.

The general structure of a P1394 serial bus is such that a single new connection between a new node and an identified node of an existing serial bus can result in the addition of multiple nodes to the serial bus. For example, a first new node having a first port coupled to a second new node may be connected to an identified node of an existing serial bus via a second port. It is further possible that the multiple new nodes may themselves form an existing configured serial bus such that the new connection results in the connection of two existing and configured serial buses.

Due to the deterministic nature of the P1394 bus configuration process, it is highly likely that the first serial bus will have one or more nodes that are assigned the same bus addresses as the nodes of the second serial bus, and a bus reset is highly desirable for such a case. Therefore, the incremental addition process described herein distinguishes between two types of nodes: Just Connected Single Nodes (JCSNs); and Just Connected Network Nodes (JCNNs). A JCSN is a new node having a single connected port, and the addition of a JCSN may be equated to the addition of a leaf to the tree structure of the serial bus. A JCSN may be added incrementally. A JCNN is a node having multiple connected ports. By definition, the identified node of the existing serial bus to which the new node is connected is a JCNN.

Figure 3:
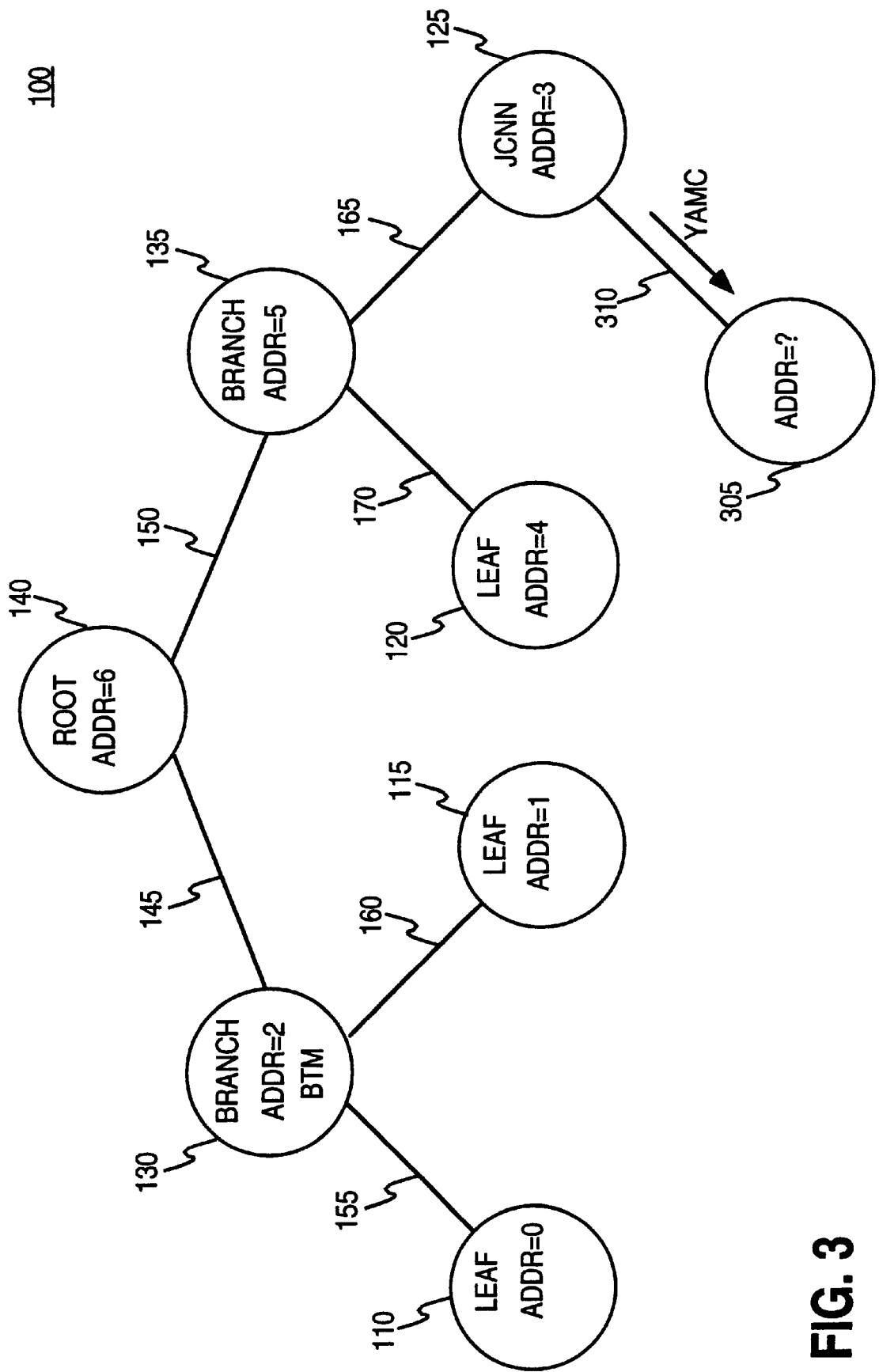
FIG. 3 shows the addition of a node to a serial bus.

FIG. 3 shows the serial bus 100 wherein a new node 305 is "connected" to the serial bus. Cable 310 couples node 305 to node 125, which identifies itself as a JCNN upon the connection event. New node 305 may be either a JCSN or a JCNN. New node 305 identifies itself as a JCSN if it has only one connected port, and new node 305 identifies itself as a JCNN if it has more than one connected port. The process of the new node identifying itself as either a JCSN or a JCNN is similar to the process of a node identifying itself as either a leaf node or a branch node during the bus initialization phase of the configuration process.

To provide the incremental addition of nodes to a serial bus, a new connect handshake protocol is defined between the newly connected node and the previously identified node of the serial bus. The result of the handshake between the new node and the identified node is determined by whether the new node is a JCSN or a JCNN. If the new node is a JCSN, the incremental addition process is initiated. If the new node is a JCNN, a bus reset is forced by the new node.

The new connect handshake protocol may be implemented in several different ways. However, according to one embodiment, the new connect handshake uses previously defined arbitration signals of the P1394 serial bus standard to discriminate between the addition of a JCSN and the addition of a JCNN. Using previously defined signals allows the incremental addition process to be implemented at a lower cost because less new circuitry is required. As the specific examples are discussed with reference to a serial bus that supports the P1394 signaling protocols, the signals of the new connect handshake may be referred to as being asserted "concurrently." For other interconnect architectures that operate according to different signaling protocols, signals of the new connect handshake may be asserted contemporaneously or sequentially, and no temporal overlap between the signals may occur.

A node that identifies itself as a JCNN initiates the new connect handshake by asserting a YOU ARE MY CHILD ("YAMC") signal on the port where a new connection is detected. According to one embodiment, the YAMC signal transmitted by the JCNN is a signal identified in the P1394 serial bus standard as the tx_child_notify line state, which results in the JCNN transmitting a value of AB=1Z.

FIG. 3 shows JCNN 125 as initiating the new connect handshake by asserting the YAMC signal. JCNN 125 may concurrently provide a speed signal indicating the speed capability of JCNN 125. If new node 305 is a JCNN, it also asserts the YAMC signal, which, as discussed below with respect to 10–12, results in a bus reset. FIGS. 4–9 discuss the case wherein new node 305 is a JCSN.

When initially powered up, a JCSN is in an idle state wherein it transmits an idle signal on the signal lines having a value of AB=ZZ. Upon detecting the new connection, a JCSN begins an internal timer wherein the JCSN will force a bus reset if a predetermined amount of time passes without receiving a YAMC signal, which may occur, for example, when a JCSN is coupled to a standard P1394 node that does not support incremental addition.

Figure 4:
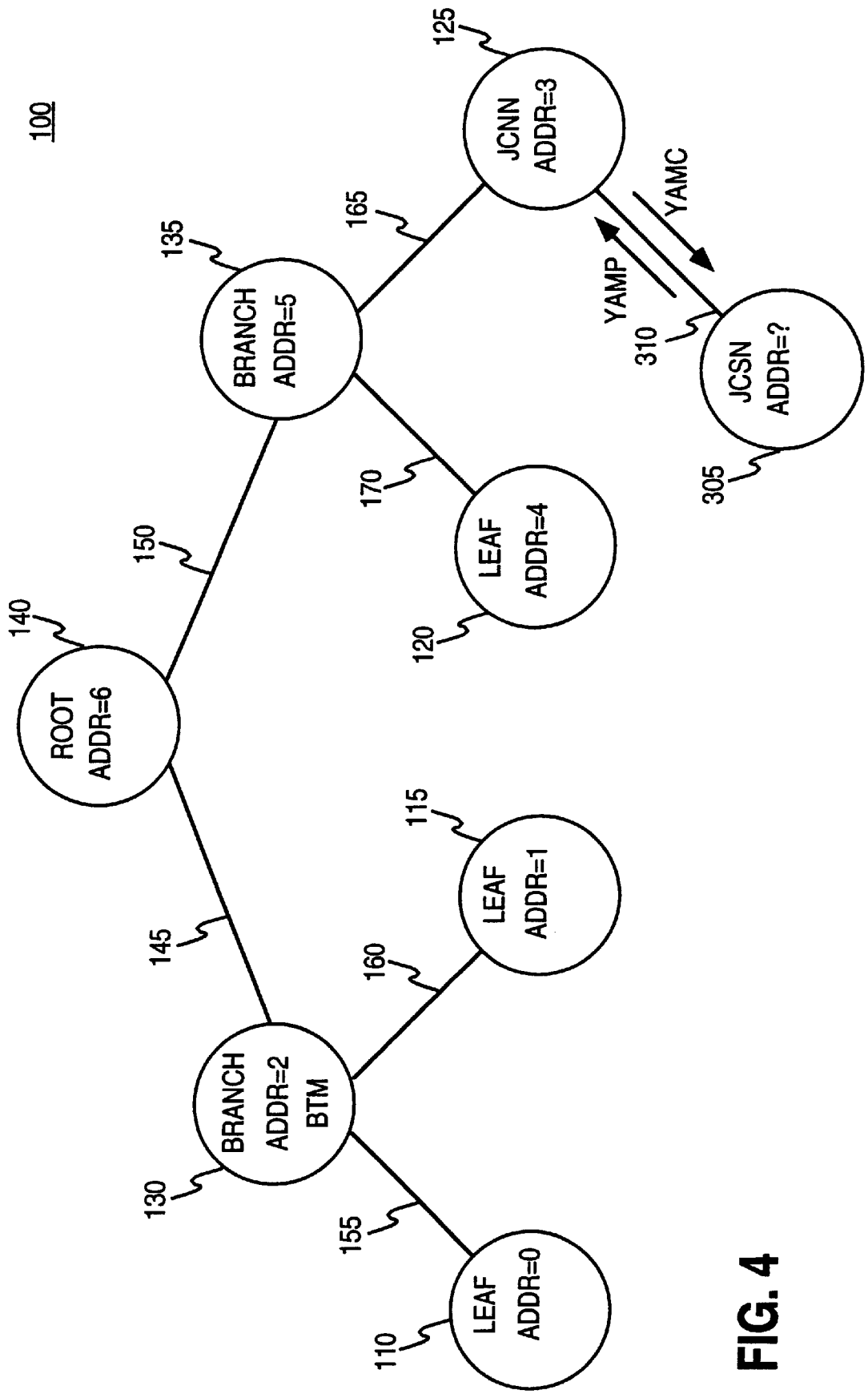
FIG. 4 begins an example of a process for adding a node to a serial bus wherein the new node is a JCSN.

As shown in FIG. 4, if new node 305 is a JCSN, JCSN 305 detects the YAMC signal and latches the speed signal of JCNN 125, if the speed signal is provided. Because of the cross-coupling of the A and B sides of the cable between nodes and because of the arbitration decoding rules described by Table 1, a JCSN detects the YAMC signal as AB=Z1. JCSN 305 responds to the YAMC signal by asserting a YOU ARE MY PARENT ("YAMP") signal. JCSN 305 may concurrently provide a speed signal indicating the speed capability of JCSN 305.

According to one embodiment, the YAMP signal is a signal identified by the P1394 serial bus standard as the tx_parent_notify, and has a transmitted value of AB=0Z. The JCNN 125 continues to assert the YAMC signal while receiving the YAMP signal. JCNN therefore detects a value of AB=10. The new connect handshake is successfully completed. The new connect handshake reverses the order of the parent-child handshake that is specified by the P1394 serial bus standard for use during the tree identification phase of the configuration process.

Figure 5:
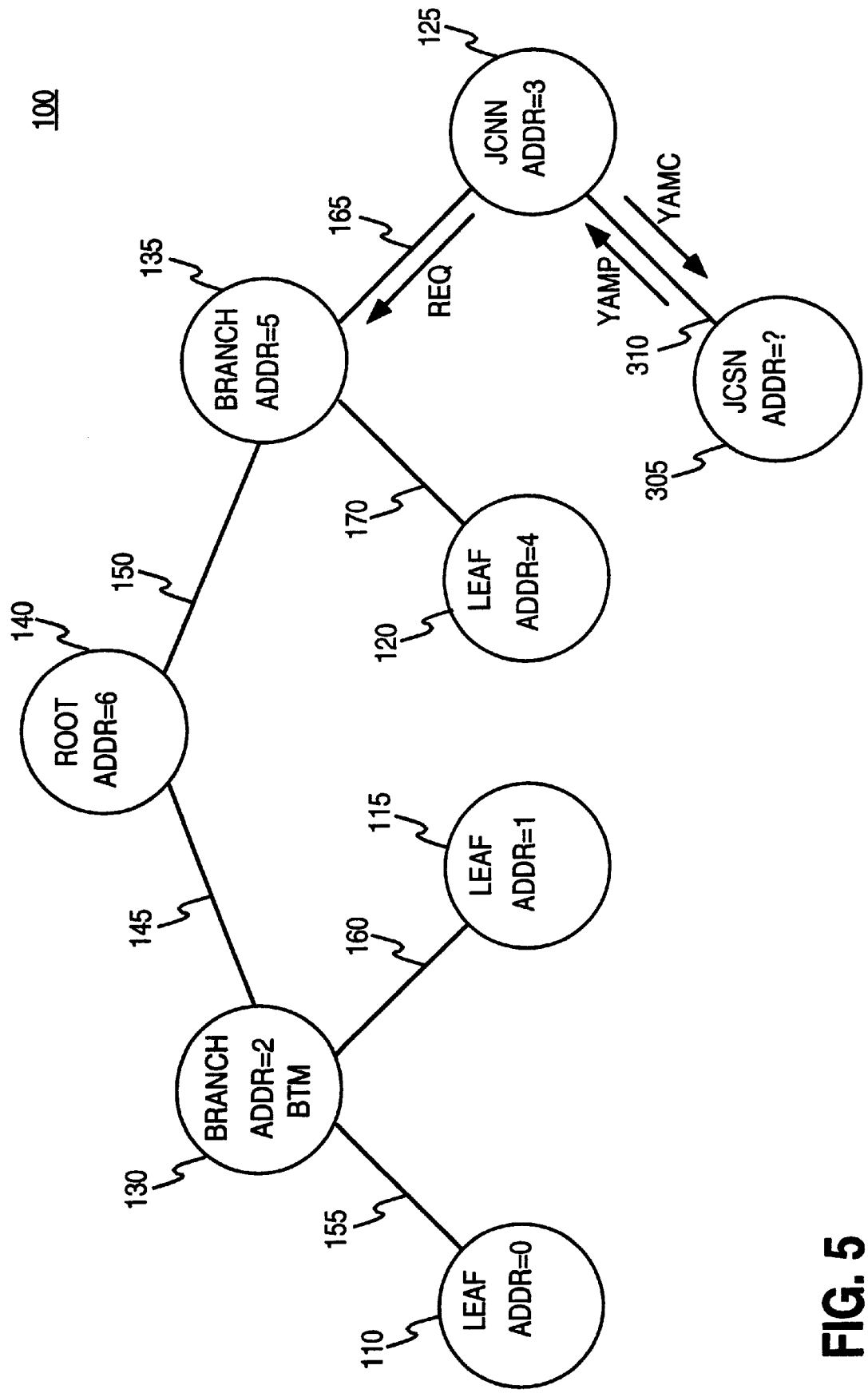
FIG. 5 continues the example began in FIG. 4.

Upon receiving the YAMP signal from JCSN 305, JCNN 125 begins to arbitrate for control of the bus, as shown in FIG. 5. JCNN 125 arbitrates for the bus by using fair arbitration, and JCNN 125 sends a request signal REQ to the root node 140 via its parent node 135 to request control of the bus. JCSN 305 and JCNN 125 continue to assert the YAMP and YAMC signals via their newly connected ports. The root node 140 arbitrates the request of JCNN 125, and replies with either a DENY signal or a GRANT signal. If the root node 140 denies the request of JCNN 125, JCNN 125 continues to arbitrate until it is granted bus access. JCSN 305 may be provided with an internal time-out mechanism for forcing a bus reset if a predetermined amount of time passes after completing the new connect handshake without receiving a GRANT signal. For one embodiment, JCNN 125 discontinues arbitration if it detects that another JCNN is currently adding another JCSN to the serial bus. JCNN 125 restarts arbitration and the timeout mechanism when it detects that the other JCSN has been successfully added to the serial bus.

Figure 6:
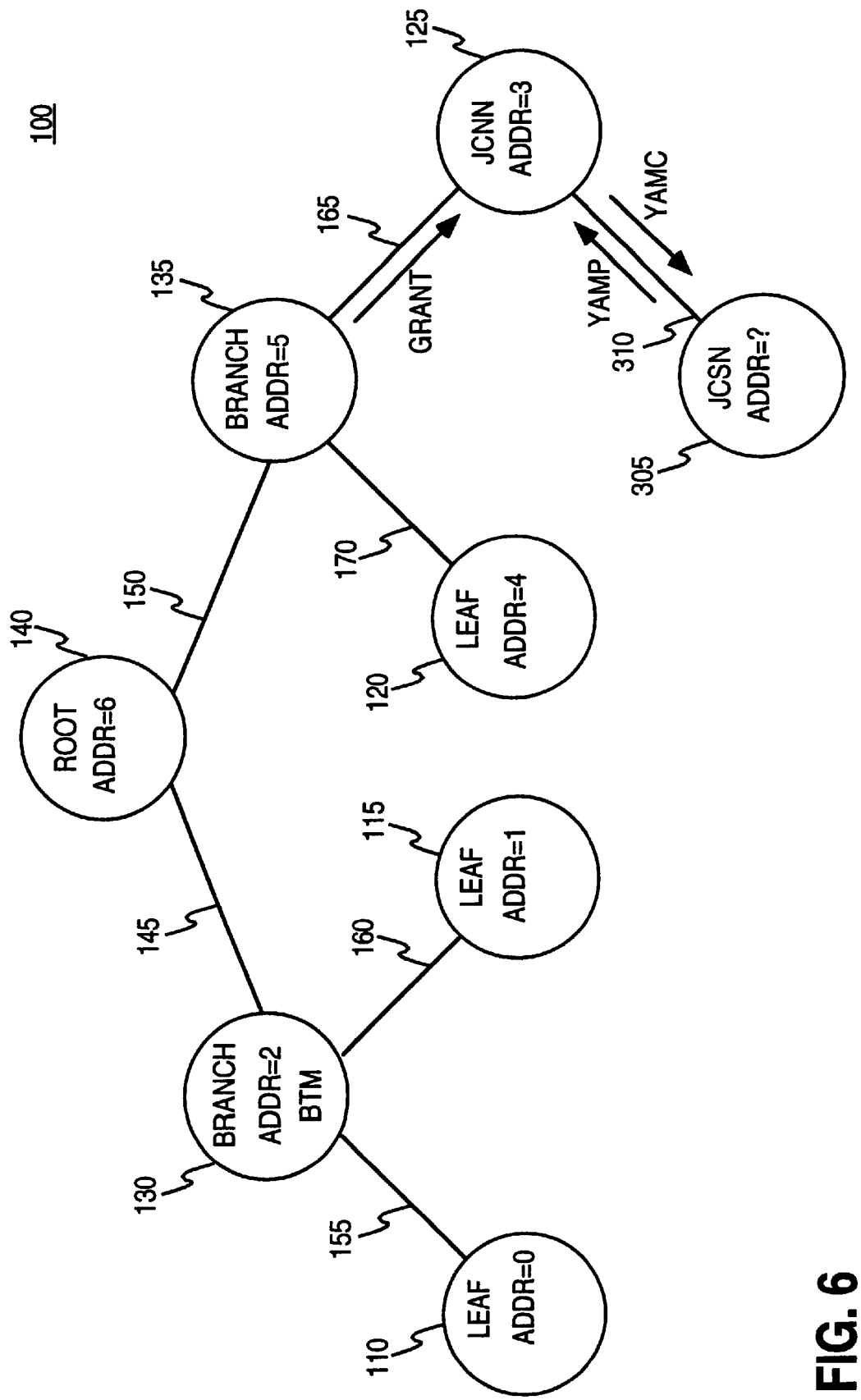
FIG. 6 continues the example began in FIG. 4.
Figure 7:
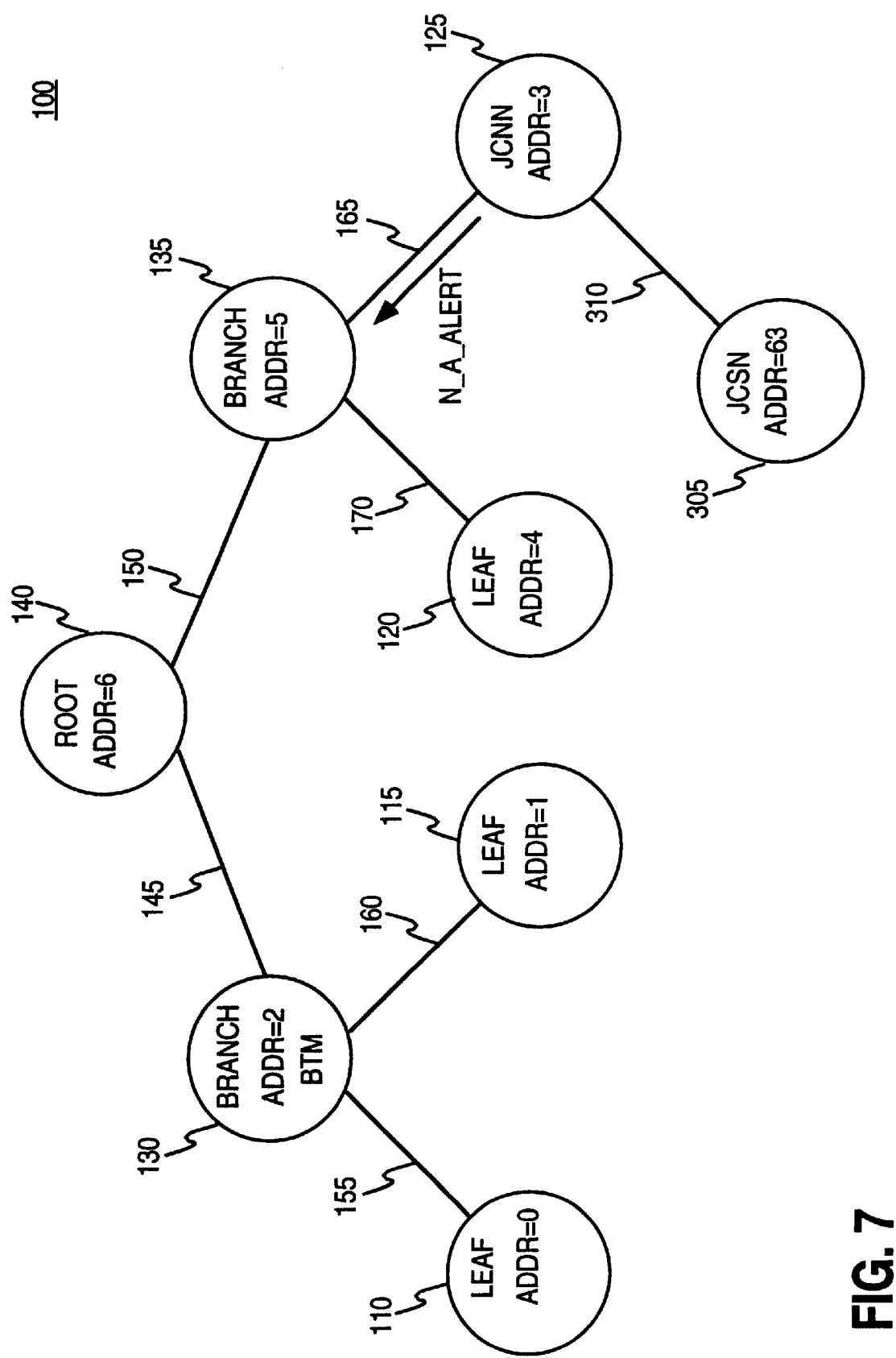
FIG. 7 continues the example began in FIG. 4.

In FIG. 6, JCNN 125 receives the GRANT signal. JCNN 125 deasserts the YAMC signal in response to receiving the GRANT signal, and JCSN 305 deasserts the YAMP signal in response to detecting the YAMC signal being deasserted such that the newly connected port enters an idle state. As shown in FIG. 7, once the newly connected port of JCNN 125 goes idle, JCNN 125 transmits a NODE_ADDED_ALERT (or "N_A_ALERT") broadcast packet to all of the nodes of serial bus 100. The NODE_ADDED_ALERT packet is discussed below with respect to FIGS. 18A–18E. The new connect handshake is complete, and JCSN 305 is assigned bus address 63, which allows JCSN 305 to receive but not transmit bus packets. According to the P1394 serial bus standard, bus address 63 is an invalid address. JCSN 305 is provided with an internal time-out mechanism wherein JCSN 305 forces a bus reset if JCSN 305 is not assigned a valid address within a specified amount of time. This is discussed in more detail below.

The NODE_ADDED_ALERT packet propagates throughout the serial bus such that it is received by BTM node 130. For the case wherein other nodes are concurrently arbitrating to add a new JCSN to the serial bus, the detection of a NODE_ADDED_ALERT packet may be used by waiting nodes as a mechanism for queuing the addition of their associated JCSNs to the serial bus. For example, when a NODE_ADDED_ALERT packet is detected, a waiting node discontinues arbitration.

Figure 8:
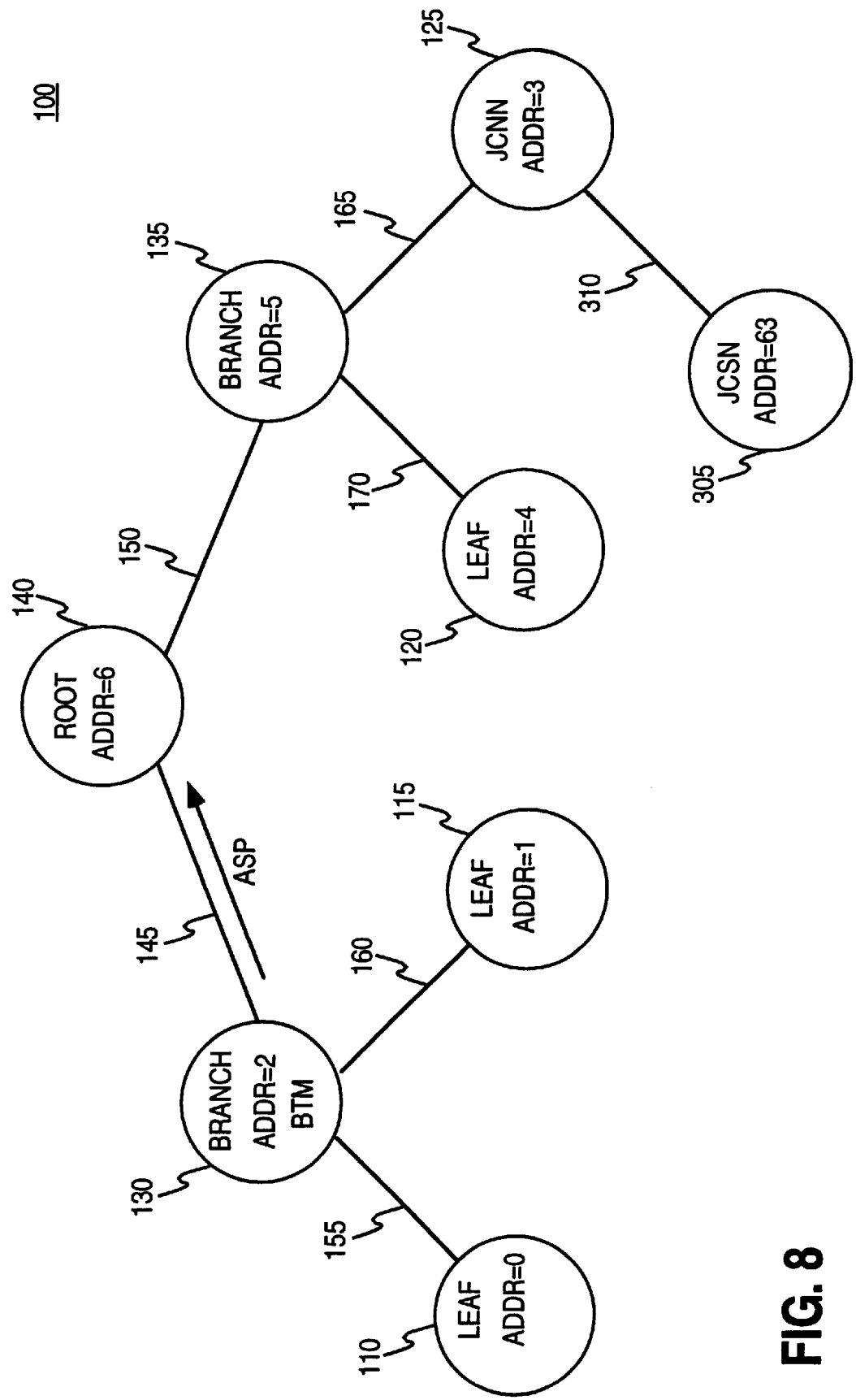
FIG. 8 continues the example began in FIG. 4.

As shown in FIG. 8, BTM node 130 responds to the NODE_ADDED_ALERT packet by sending an ADDRESS_SET packet (or "ASP") that causes a node having a bus address of 63 to set its address to the address specified in the ADDRESS_SET packet. Because multiple requests to add JCSNs are queued, typically only one JCSN will be allowed to receive the ADDRESS_SET packet. The ADDRESS_SET packet propagates throughout the serial bus 100 such that JCSN 305 receives the ADDRESS_SET packet. The ADDRESS_SET packet may be used by waiting nodes to indicate when arbitration to add a JCSN may begin again. The ADDRESS_SET packet is described in more detail below. If no bus topology manager is provided, an ADDRESS_SET packet will not be sent within the specified amount of time, and JCSN 305 will force a bus reset.

Figure 9:
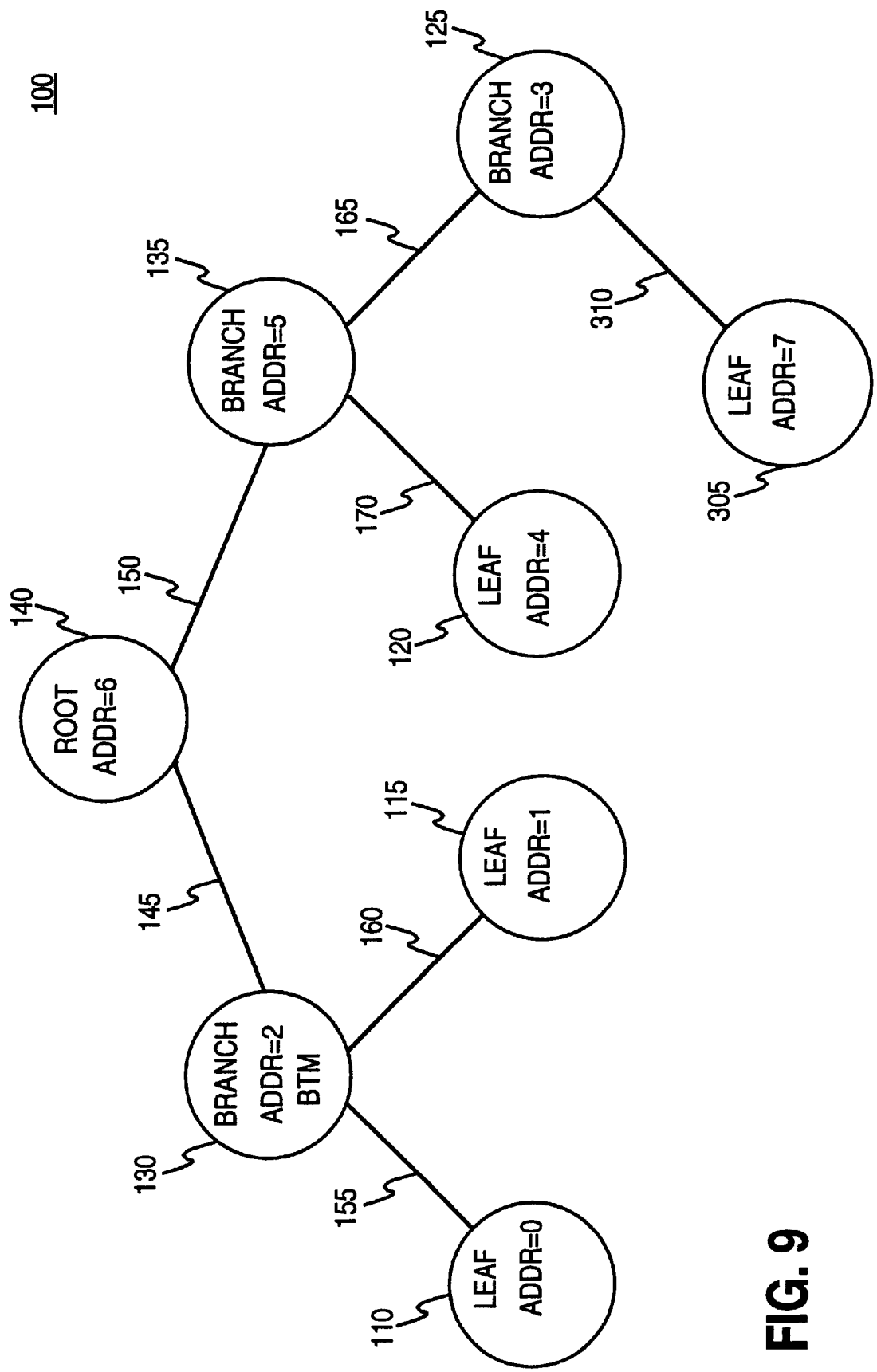
FIG. 9 completes the example began in FIG. 4.

As described above, the BTM node 130 maintains a topology map for serial bus 100 such that the BTM node 130 is aware of the currently assigned bus addresses. BTM node 130 may thus ensure that a unique address is assigned to JCSN 305. As shown in FIG. 9, JCSN 305 may be assigned the next highest available address as a matter of convenience. Thus, JCSN 305 is assigned bus address 7. As will be shown, the assigned addresses for a serial bus that provides for incremental configuration may differ significantly from a serial bus that requires reconfiguration when a new node is added to the serial bus.

Figure 10:
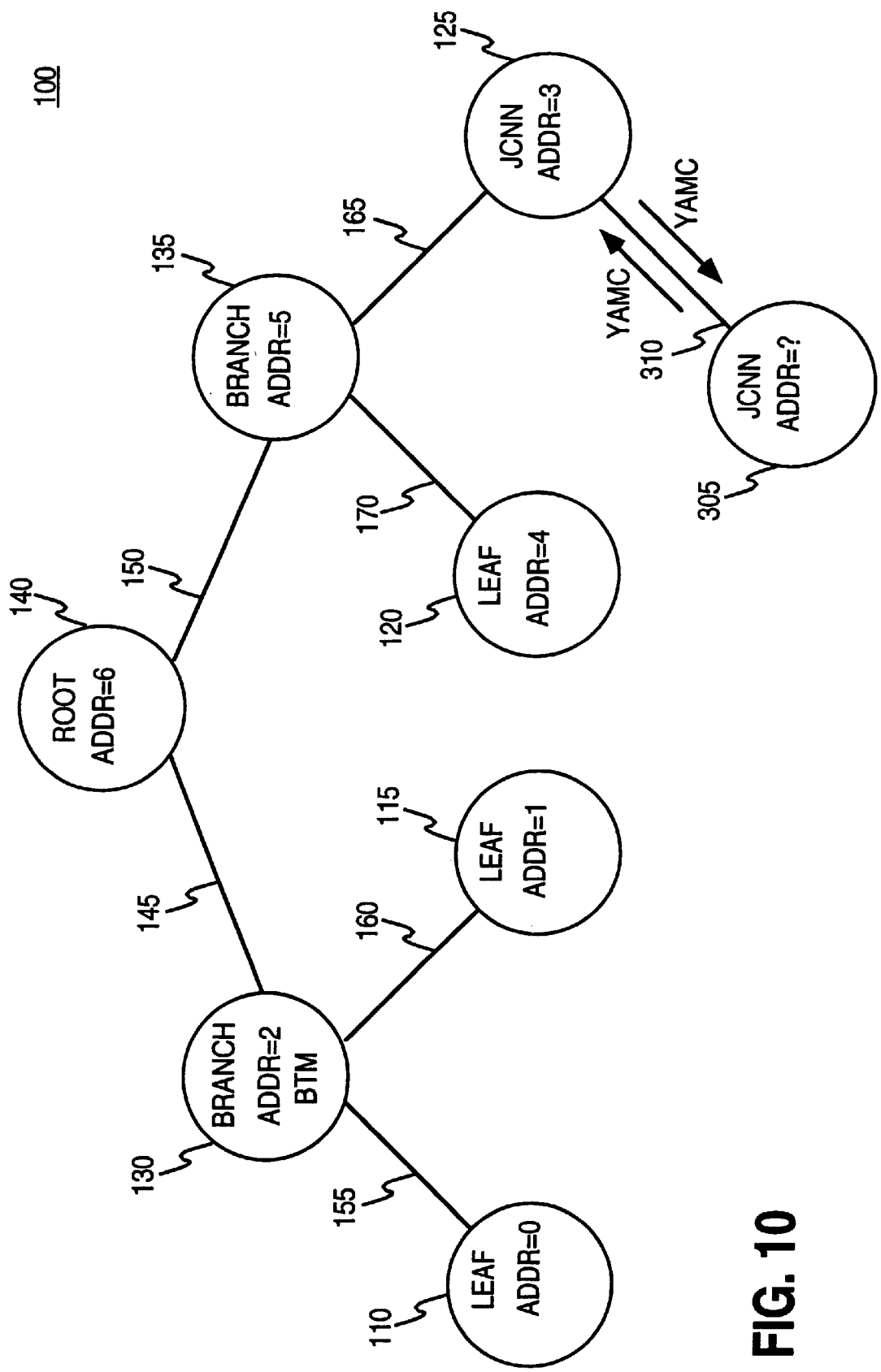
FIG. 10 begins an example of a process for adding a node to a serial bus wherein the new node is a JCNN.
Figure 11:
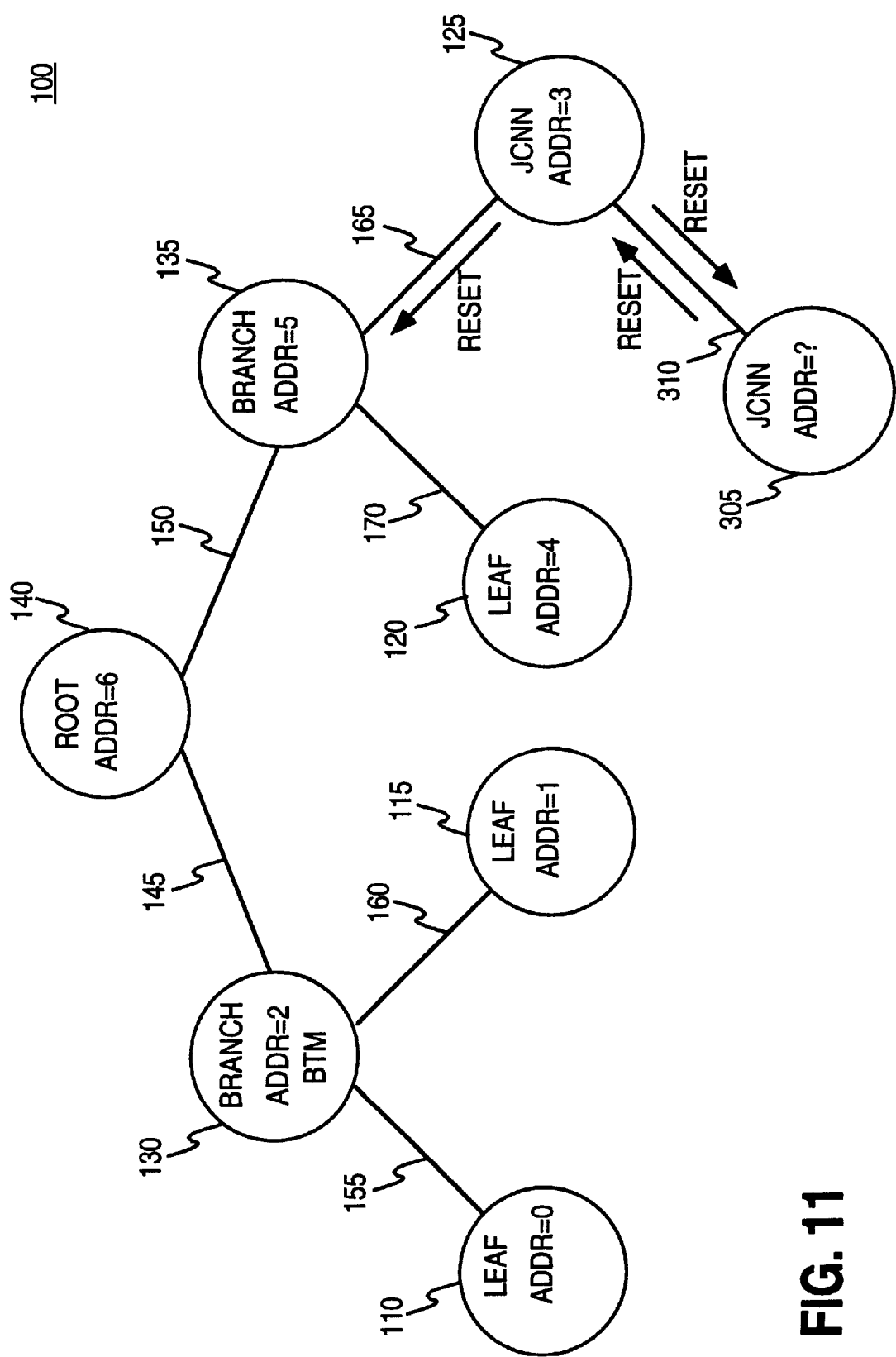
FIG. 11 continues the example began in FIG. 10.
Figure 12:
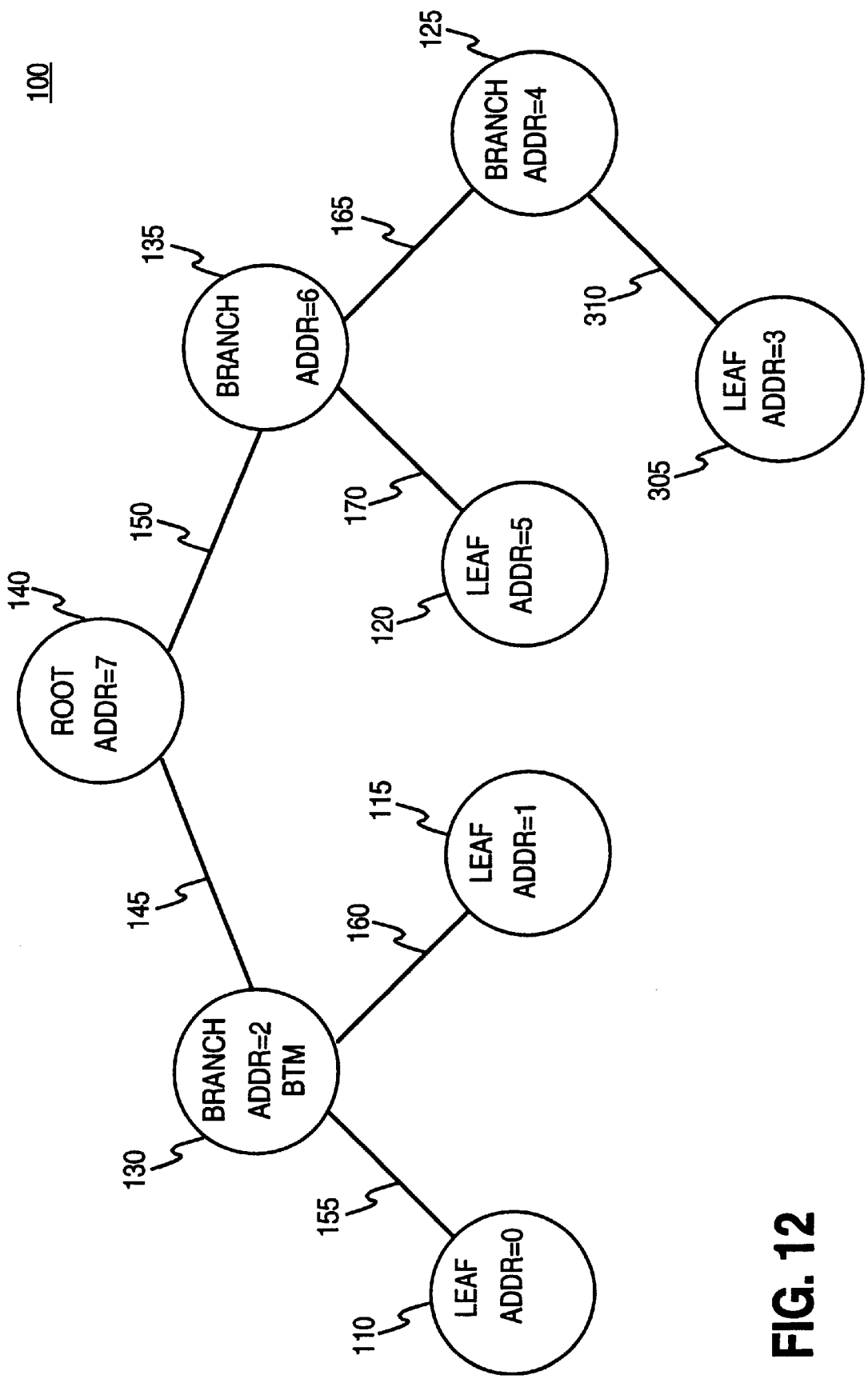
FIG. 12 completes the example began in FIG. 10.

FIGS. 10–12 show the outcome of the new connect handshake when new node 305 is a JCNN. Upon power up, node 305 identifies itself as a JCNN. As described above, a JCNN initiates the new connect handshake upon detection of the connection event by asserting the YAMC signal. JCNN 125 behaves similarly such that JCNN 125 and JCNN 305 concurrently assert YAMC signals, wherein the transmitted value for each JCNN is AB=1Z. This is shown in FIG. 10. JCNNs 125 and 305 both detect AB=11, which is the bus_reset signal specified by the P1394 serial bus standard. As shown in FIG. 11, both nodes respond by sending out the RESET signal on all connected ports such that a full bus reset occurs.

FIG. 12 shows the result of the bus reconfiguration. During the initialization phase of the bus configuration process, nodes 110–120 and 305 are identified as leaf nodes, and nodes 135–140 are identified as branch nodes. During the tree identification phase of the bus configuration process, node 140 may again be identified as the root node. During the self-identification phase of the configuration process, node 110 is assigned address 0, node 115 is assigned address 1, node 130 is assigned address 2, node 305 is assigned address 3, node 125 is assigned address 4, node 120 is assigned address 5, node 135 is assigned address 6, and root node 140 is assigned address 7.

A comparison of the assigned bus addresses shown in FIGS. 9 and 12 shows that the node addresses resulting from incremental addition of nodes may be different than the node addresses for the normal bus configuration process. Occasionally, it may be necessary for the bus topology manager of the serial bus to rebuild the topology map for the serial bus, and, according to the prior art, the bus topology manager may force a bus reset to rebuild the topology map. When incremental addition of nodes is not allowed, forcing a bus reset to rebuild the topology map typically results in the identical topology map being recovered. Given the incremental addition process described herein, the recovery of an identical topology map can no longer be ensured. Further, a bus reset interrupts bus traffic. Therefore, as will be discussed with respect to FIGS. 23–26, the bus topology manager may be provided with a mechanism for polling the nodes of serial bus such that a topology map for the serial bus may be built without requiring a bus reset.

Figure 13:
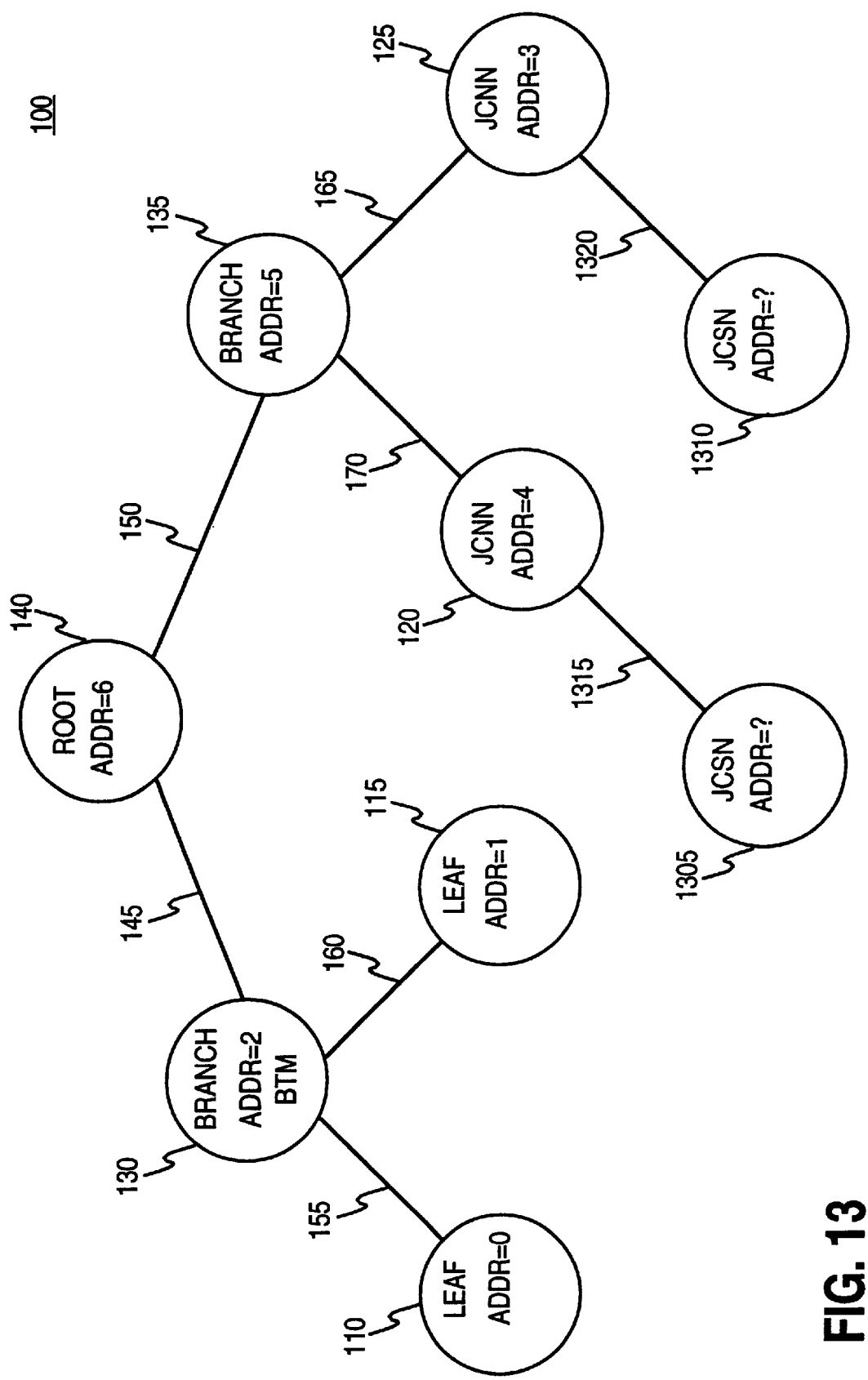
FIG. 13 shows the addition of multiple nodes to the serial bus.
Figure 14:
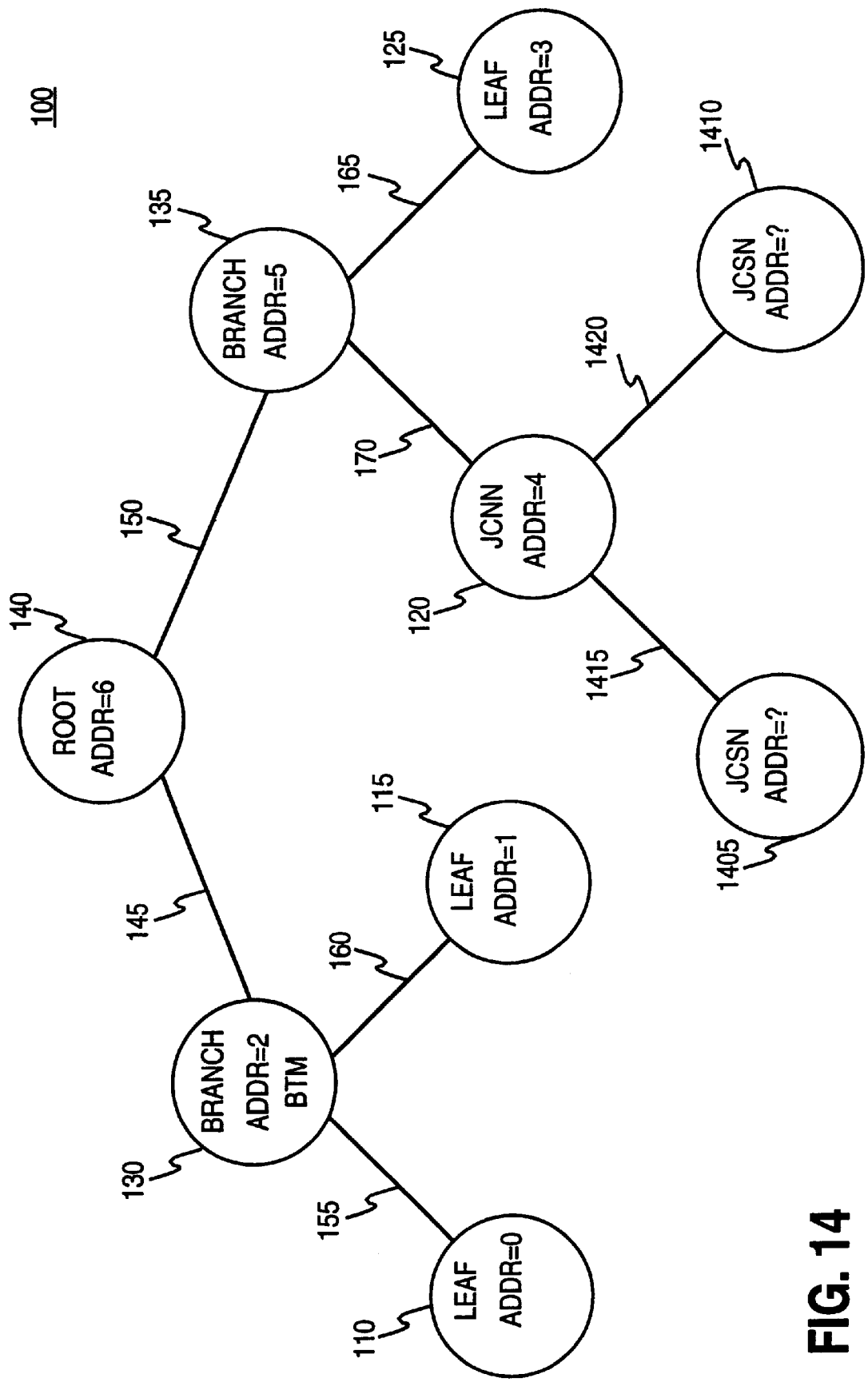
FIG. 14 shows the addition of multiple nodes to the serial bus, wherein multiple nodes are coupled to the same JCNN of the serial bus.

The addition of a JCSN discussed with respect to FIGS. 3–9 is a relatively simple example. FIGS. 13 and 14 show more complex examples. FIG. 13 shows the concurrent addition of two JCSNs to serial bus 100, wherein each JCSN is coupled to a different JCNN. For example, JCSN 1305 is coupled to JCNN 120 via cable 1315, and JCSN 1310 is coupled to JCNN 125 via cable 1320. FIG. 14 shows the concurrent addition of two JCSNs to serial bus 100 via the same JCNN. For example, JCSN 1405 is coupled to JCNN 120 via cable 1415, and JCSN 1410 is coupled to JCNN 120 via cable 1420. To allow the concurrent addition of multiple JCSNs, the queuing mechanism mentioned above and described below with respect to FIGS. 19–22 may be employed.

Figure 15:
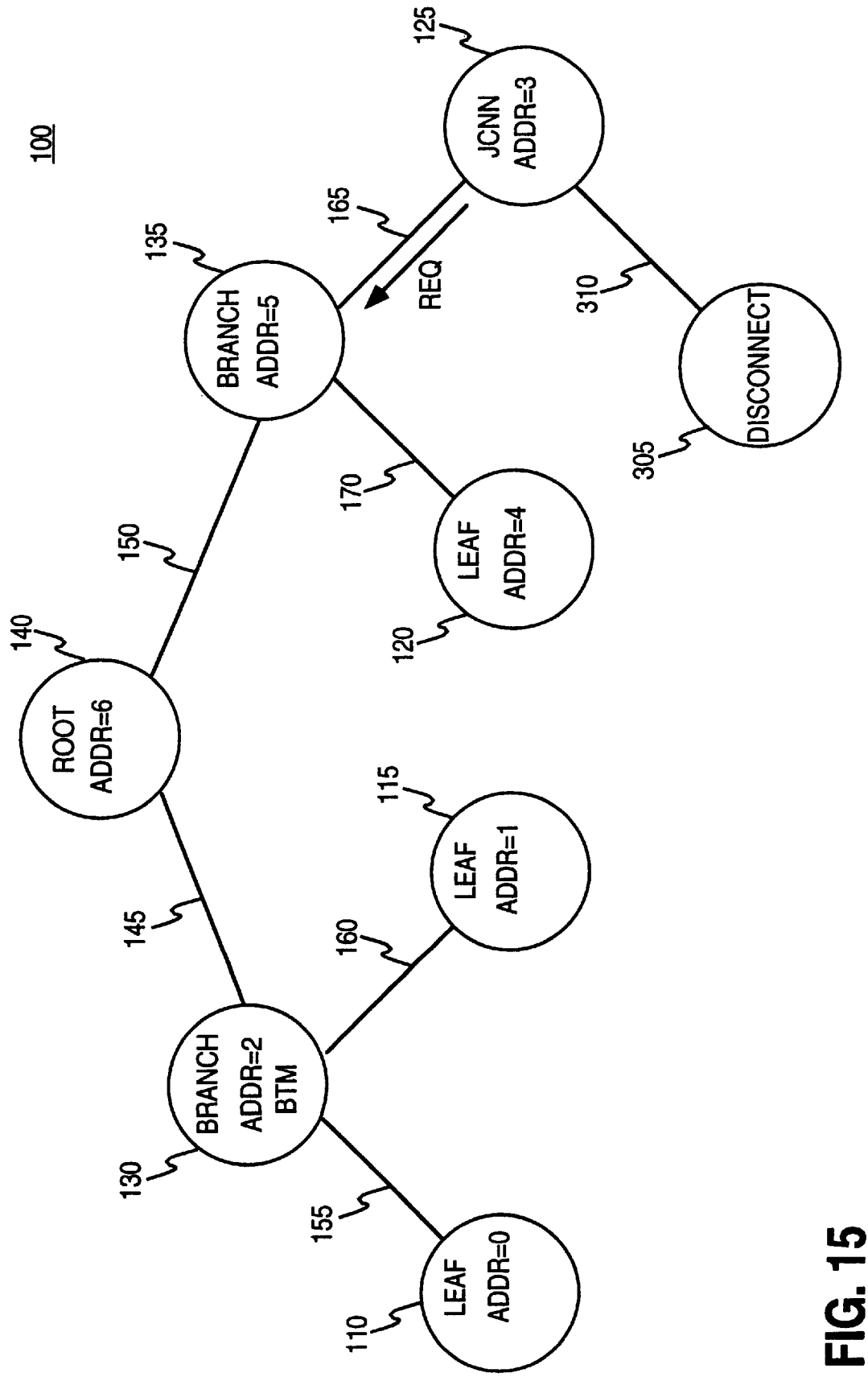
FIG. 15 begins an example of a process for subtracting a node from the serial bus.
Figure 16:
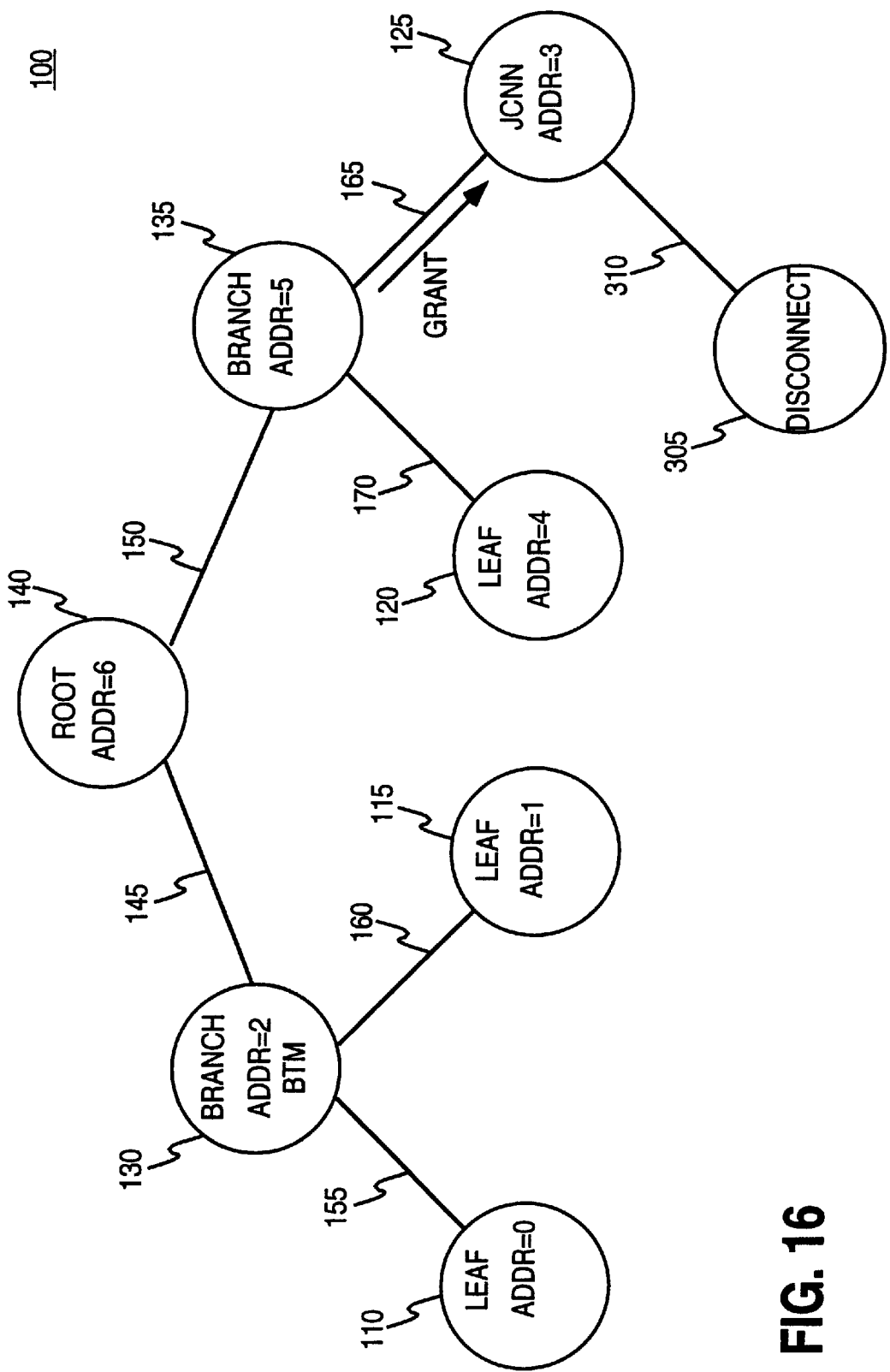
FIG. 16 continues the example began in FIG. 15.
Figure 17:
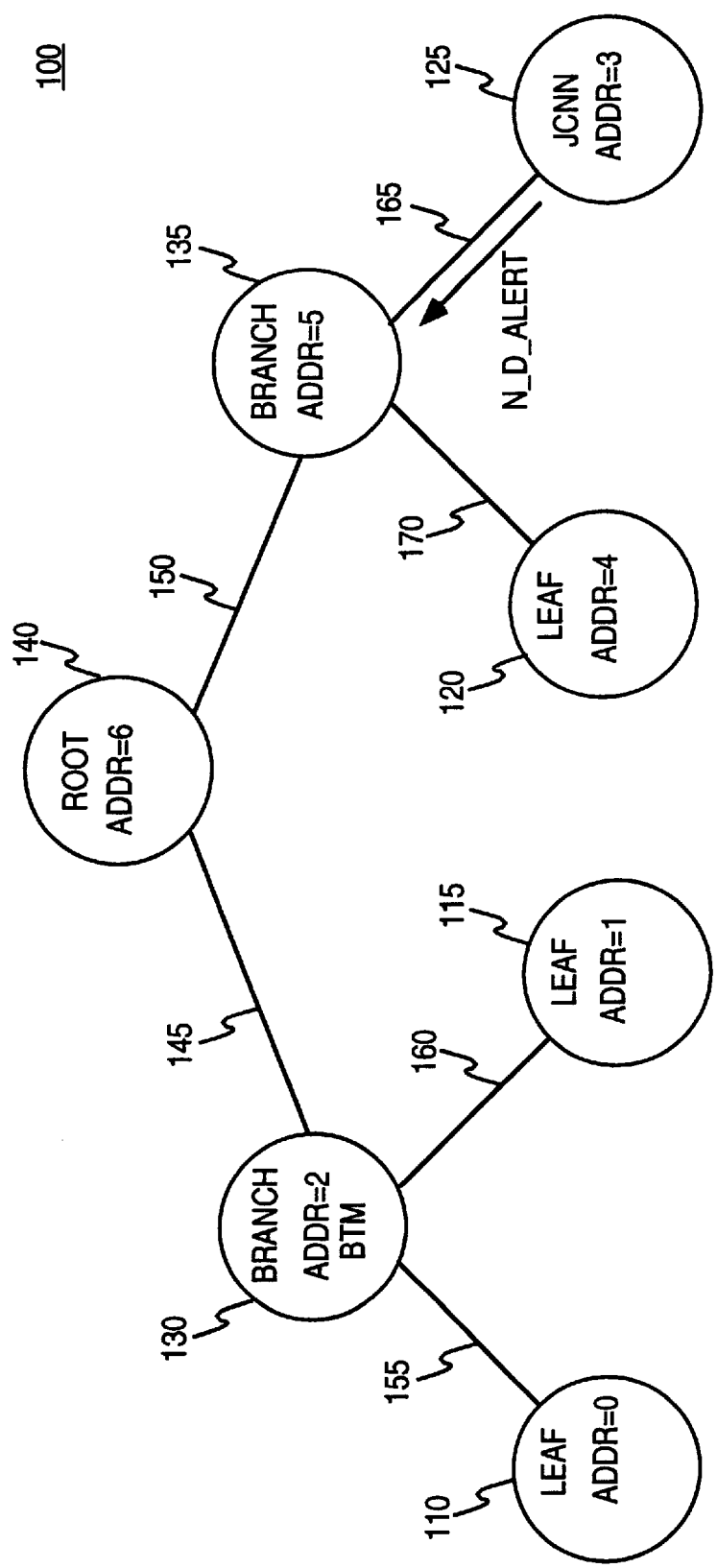
FIG. 17 completes the example began in FIG. 16.

The incremental disconnection of nodes is now discussed with respect to FIGS. 15–17. As shown in FIG. 15, node 305 is disconnected from the serial bus 100. Node 125 detects the disconnection and makes a request for control of the serial bus 100. Root node 140 grants the request in FIG. 16. In FIG. 17, node 125 sends a NODE_DETACHED_ALERT (or "N_D_ALERT") packet. The incremental disconnection process is complete. Additional details regarding disconnection are discussed with respect to FIG. 22.

The NODE_ADDED_ALERT packet, the SET_ADDRESS packet, and the NODE_DETACHED_ALERT packet are now discussed with respect to FIGS. 18A–18E. The form that these packets may take may vary depending on the desired implementation. For example, the NODE_ADDED_ALERT packet may simply be a SELF_ID packet as specified by the P1394 serial bus standard. Because SELF_ID packets are normally sent only during the bus configuration process, the bus topology manager can use the SELF_ID packet to determine where a new node has been added. The SET_ADDRESS packet may also be a PHY configuration packet as specified by the P1394 serial bus standard, wherein bits of the PHY configuration packet that are normally unused are used to set the address of the new node.

Figures 18A, 18B, 18C, 18D, 18E:
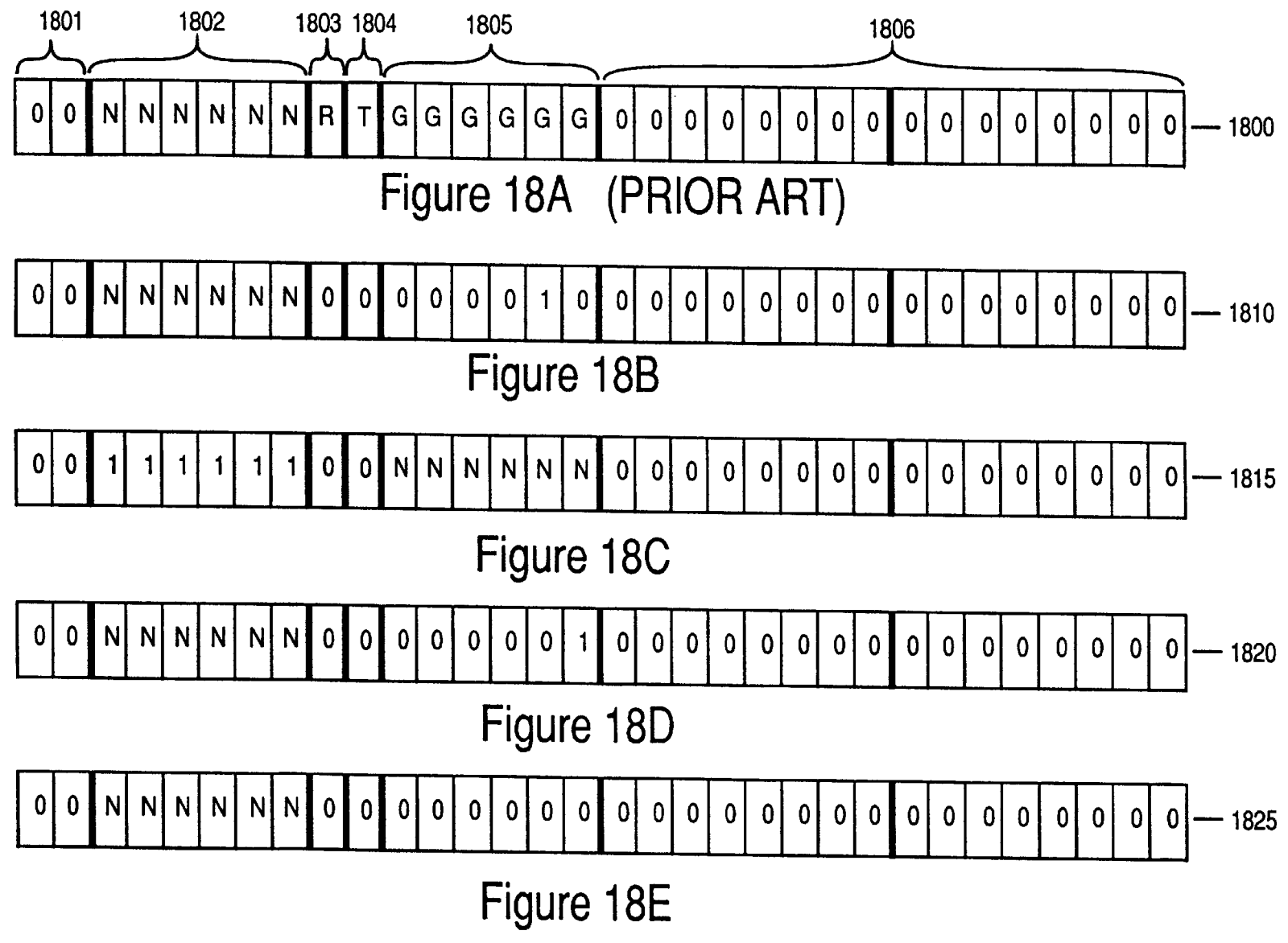

Alternatively, the NODE_ADDED_ALERT, the SET_ADDRESS packet, and the NODE_DETACHED_ALERT may take the form of a new type of PHY configuration packet as described with respect to FIGS. 18B–18D. FIG. 18A shows the first quadlet of a PHY configuration packet 1800 as defined by the P1394 serial bus standard. The second quadlet (not shown) of a PHY configuration is simply the logical inverse of the first quadlet. As shown, a quadlet comprises thirty-two bits of data divided into six different fields. Identifier field 1801 comprises two bits of logic 0, which identifies the packet as a PHY configuration packet. Node_ID field 1802 comprises six bits that specify a node address. Set_root_control bit 1802 is set to a logic 1 if a new node is to become the root. According to the P1394 serial bus standard, the node_ID field 1802 is ignored if the set_root_control bit 1803 is set to a logic 0. Set_gap_timer control bit 1804 is set to a logic 1 if a new gap count is being specified in the gap_count field 1805, which comprises six bits. According to the P1394 serial bus standard, the gap_count field 1805 is ignored if the set_gap_timer_control bit 1803 is set to a logic 0. An undefined field 1806 follows the gap_count field 1805 and comprises sixteen bits.

Special PHY configuration packets may be defined by recognizing that a normal PHY configuration packet is ignored if both the set_root_control bit 1803 and the set_gap_timer_control bit 1804 are set to logic 0's. FIG. 18B shows a NODE_ADDED_ALERT PHY configuration packet 1810 wherein both the set_root_control bit 1803 and the set_gap_timer_control bit 1804 are set to logic 0's, the node_ID field 1802 includes the bus address of the node sending the packet, and all bits but the next to least significant bit of the gap_count field 1805 are set to a logic 0. FIG. 18C shows a SET_ADDRESS packet PHY configuration packet 1815 wherein both the set_root_control bit 1803 and the set_gap_timer_control bit 1804 are set to logic 0's, the node_ID field 1802 is set to all logic 1's, and the gap_count filed 1805 includes the address to which the new node is to be set. FIG. 18D shows a NODE_DETACHED_ALERT PHY configuration packet 1820 wherein both the set_root_control bit 1803 and the set_gap_timer_control bit 1804 are set to logic 0's, the node_ID field 1802 includes the bus address of the node sending the packet, and all bits but the least significant bit of the gap_count field 1805 are set to a logic 0.

FIG. 18E shows a SEND_SELF_ID packet 1825 wherein both the set_root_control bit 1803 and the set_gap_timer_control bit 1804 are set to logic 0's, the node_ID field 1802 includes the bus address of the destination node, and all bits of the gap_count field 1805 are set to a logic 0. The SEND_SELF_ID packet may be used by a BTM to build a topology map without requiring a bus reset. This is discussed in more detail below.

The special PHY configuration packets shown in FIGS. 18B–18E are advantageous in that they are simply ignored by nodes that operate strictly according to the P1394 serial bus standard, and the addition of nodes that support incremental addition of nodes to the serial bus may be done in a relatively unobtrusive manner. It is therefore sufficient that only new nodes and identified nodes of the serial bus to which a new node may be connected contain circuitry for performing the incremental addition process.

Figure 19:
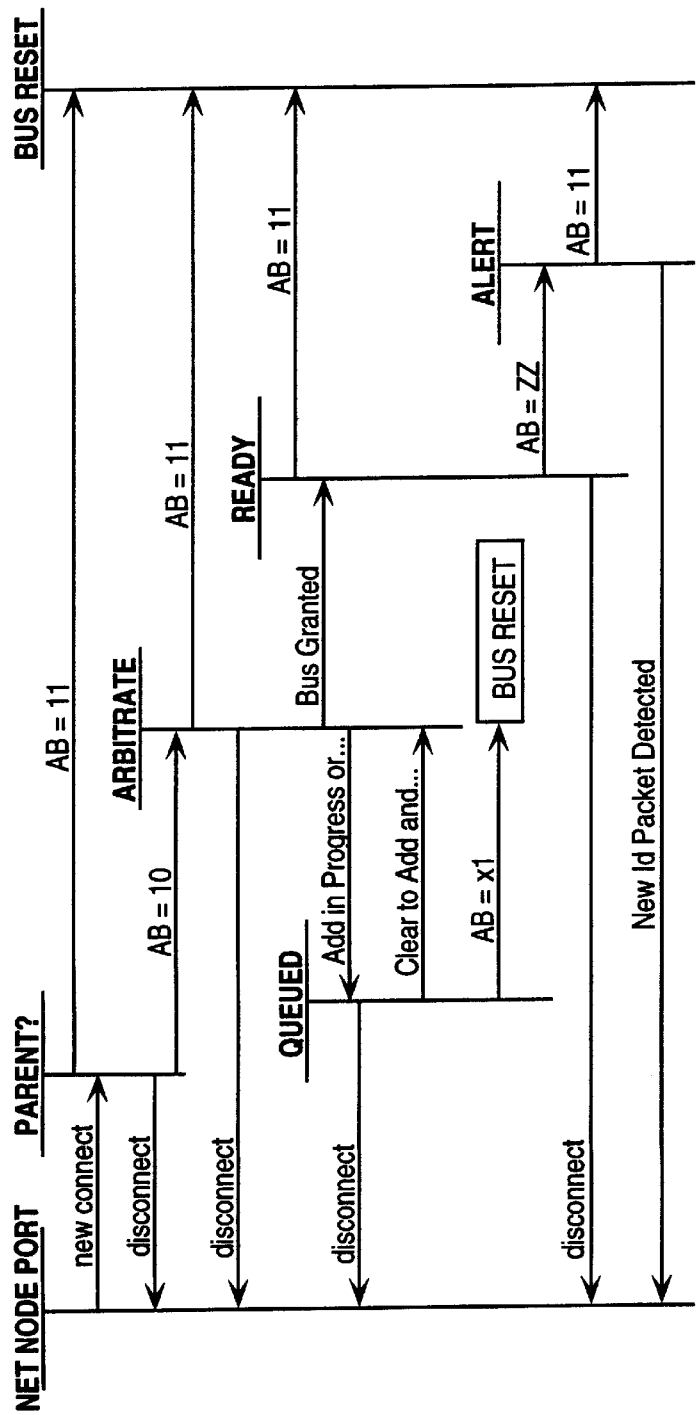
FIG. 19 shows a JCNN new connect state machine.
Figure 20:
FIG. 20 shows a JCNN node addition process detection state machine.
Figure 21:
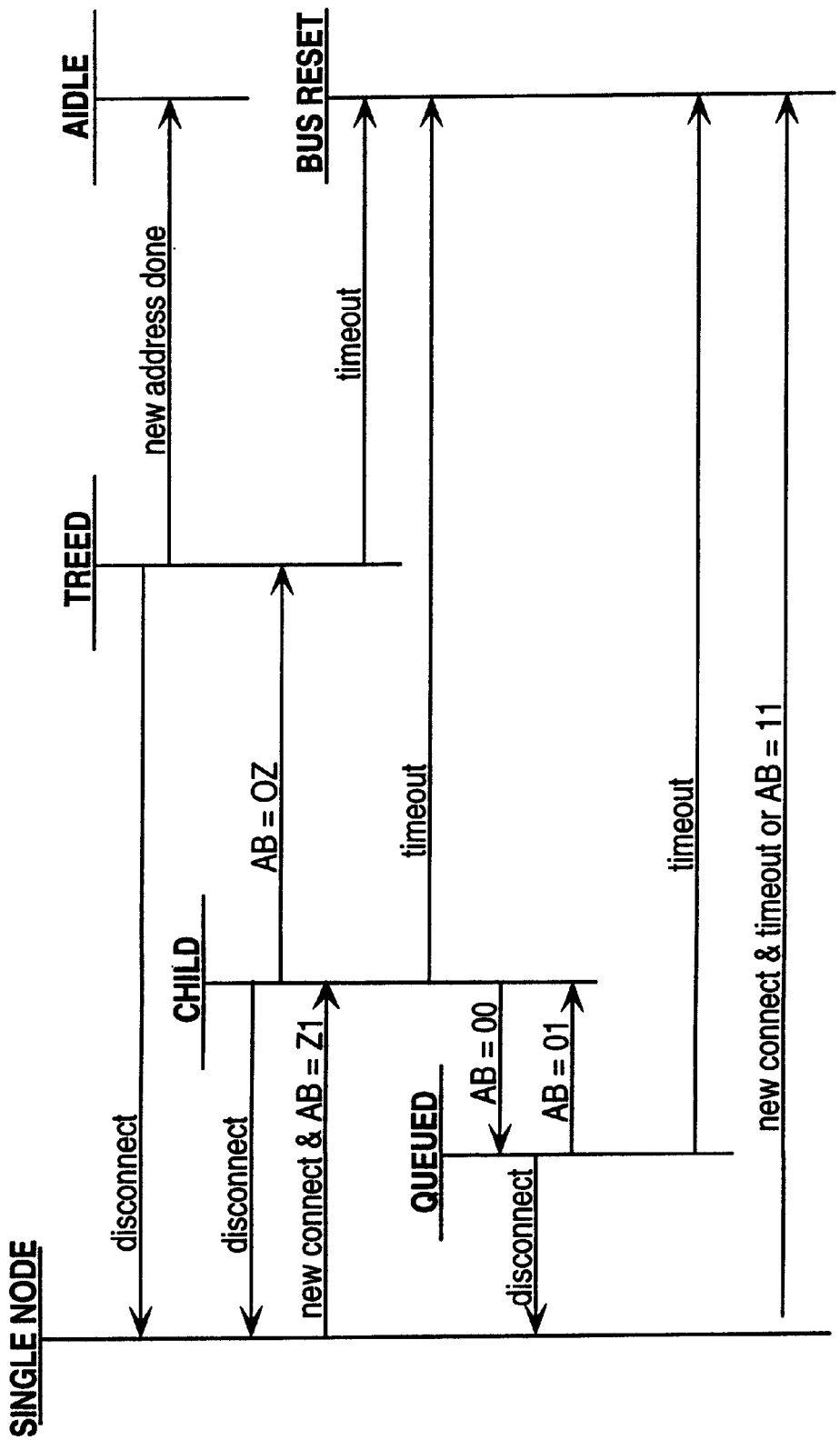
FIG. 21 shows a JCSN new connect state machine.
Figure 22:
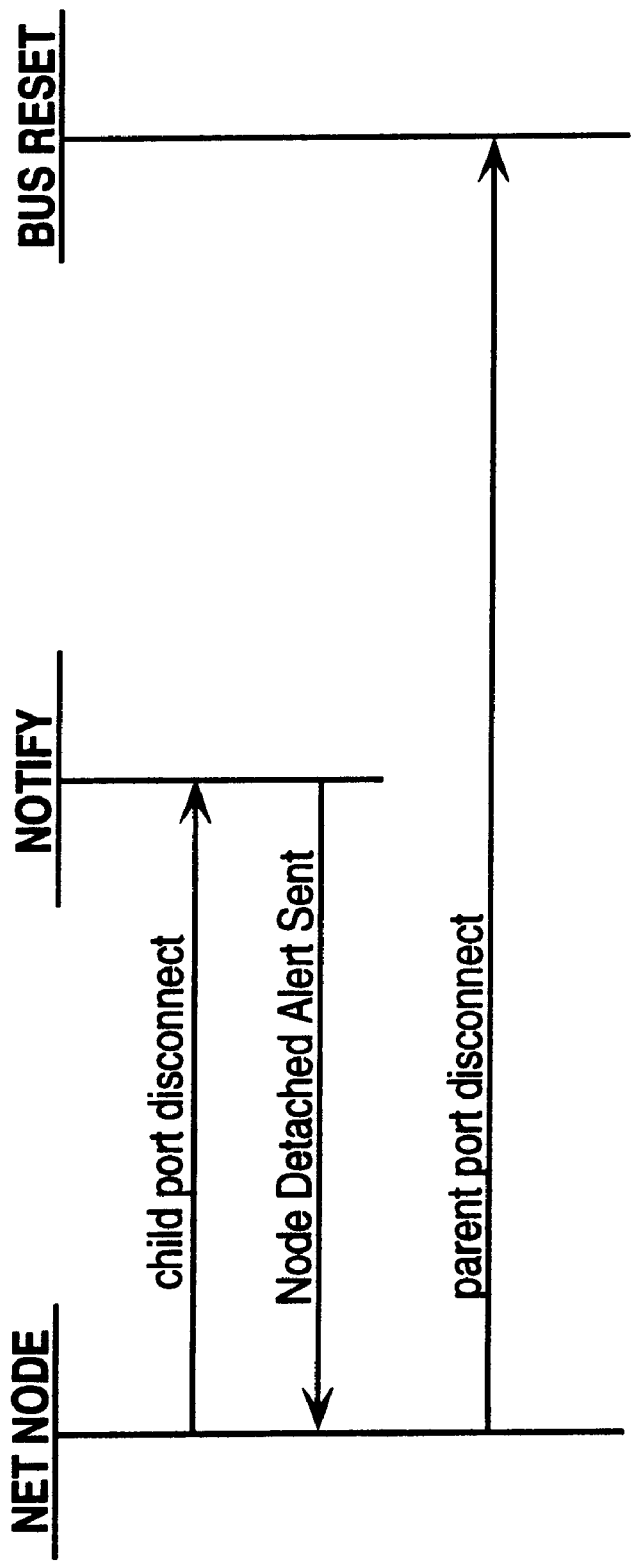
FIG. 22 shows a JCNN new disconnect state machine.

FIGS. 19–22 are state diagrams for state machines used by JCSNs and JCNNs to perform the incremental addition process according to one embodiment. Specifically, FIG. 19 shows a new connect state machine for a JCNN; FIG. 20 shows a node addition process detection state machine for JCNNs so that multiple JCSNs that are connected concurrently may be added to the serial bus in a sequential manner; FIG. 21 shows a new connect state machine for a JCSN; and FIG. 22 shows a new disconnect state machine for a JCNN.

Each port of a JCNN includes a JCNN new connect state machine. FIG. 19 shows that the JCNN new connect state machine is capable of being in one of seven states: NET NODE PORT, PARENT?, ARBITRATE, READY, QUEUED, ALERT, and BUS RESET. The NET NODE PORT state is the starting state for a JCNN new connect state machine. The JCNN new connect state machine remains in the NET NODE PORT state unless a new connection is detected, at which time the JCNN new connect state machine transitions to the PARENT? state.

While in the PARENT? state, the JCNN asserts a YAMC signal and a speed signal on its newly connected port. If the newly connected node is also a JCNN, the JCNN node detects a value on the cable of AB=11, at which time the JCNN requests a bus reset, and the JCNN new connect state machine transitions to the BUS RESET state. If the newly connected node is a JCSN, the JCNN detects the value of the cable of the newly connected port as being AB=10, at which time the JCNN new connect state machine for the newly connected port of the JCNN transitions to the ARBITRATE state.

While in the ARBITRATE state, the JCNN performs fair arbitration for the serial bus 100 and turns off its speed signal to the newly connected port. The JCNN new connect state machine transitions from the ARBITRATE state to the BUS RESET state if it detects a value of AB=11 at its associated port, which indicates that the newly connected JCSN has requested a bus reset. The JCNN new connect state machine transitions from the ARBITRATE state to the READY state if the JCNN receives a bus grant signal from the root node.

The JCNN new connect state machine transitions from the ARBITRATE state to the QUEUED state if a lower numbered port of the JCNN is already in the ARBITRATE state, if another port of the JCNN is already in the READY state, if another port of the JCNN is already in the ALERT state, or if another JCNN is in the process of adding a new node, which is indicated by the output of the JCNN node addition process detection state machine.

While in the QUEUED state, the JCNN asserts the AB=OZ signal on its newly connected port. The JCNN new connect state machine transitions from the QUEUED state back to the NET NODE PORT state if the new node is subsequently disconnected. The JCNN new connect state machine transitions from the QUEUED state to the bus reset state if the newly connected port detects the value of AB=x1, which indicates that the newly connected JCSN has requested a bus reset. The JCNN new connect state machine of a newly connected port transitions from the QUEUED state back to the ARBITRATE state if the JCNN is clear to add the JCSN as indicated by the JCNN node addition process detection state machine, if no other port of the JCNN is in the READY state, if no other port of the JCNN is in the ALERT state, and if no lower numbered port is in the ARBITRATE state.

Once the JCNN new connect state machine enters the READY state, the JCNN asserts an idle signal on its newly connected port. If the newly connected port is subsequently disconnected while the JCNN new connect state machine is in the READY state, the JCNN new connect state machine transitions to the NET NODE PORT state. The JCNN new connect state machine transitions from the READY state to the BUS RESET state if it detects a value of AB=11 on its newly connected port. The JCNN new connect state machine transitions from the READY state to the ALERT state if it detects a value of AB=ZZ on its newly connected port.

While in the ALERT state, the JCNN sends a NODE__ADDED__ALERT packet and then clears the "New Connect" status of the newly connected port. The JCNN new connect state machine will transition back to the NET NODE PORT once an SET__ADDRESS packet is detected. If the JCNN detects that the value at the newly connected port is AB=11, the JCNN new connect state machine transitions from the ALERT state to the bus reset state.

The QUEUED state of the JCNN new connect state machine provides for the sequential addition of multiple JCSNs that are added to the serial bus at substantially the same time. Because each port includes a JCNN new connect state machine, incremental configuration is allowed even when multiple JCSNs are added to the same JCNN at substantially the same time.

FIG. 20 shows the JCNN node addition process detection state machine, which is used to determine when a JCNN new connect state machine should enter or leave the QUEUED state. The JCNN node addition process detection state machine has two possible states and starts in a CLEAR TO ADD state. If a JCNN receives a NODE__ADDED__ALERT packet, the JCNN node addition process detection state machine transitions from CLEAR TO ADD state, to the ADD IN PROGRESS state. The JCNN new connect state machines for ports that are arbitrating to send a NODE__ADDED__ALERT packet transition from the ARBITRATE state to the QUEUED state in response to the JCNN node addition process detection state machine being in the ADD IN PROGRESS state. Once a SET__ADDRESS packet is received, the JCNN node addition detection state machine transitions from the ADD IN PROGRESS state back to the CLEAR TO ADD state.

FIG. 21 shows a JCSN new connect state machine, which is shown as including the following six states: SINGLE NODE, CHILD, TREED, AIDLE, QUEUED, and BUS RESET. The starting state for the JCSN new connect state machine is the SINGLE NODE state. When the new connection is detected by the JCSN, the JCSN starts a timeout timer. The JCSN new connect state machine transitions from the SINGLE NODE state to the CHILD state when a YAMC signal is received. If, as indicated by the timeout timer, the YAMC signal is not detected within a predetermined time T1, which may be 300 milliseconds, the JCSN requests a bus reset such that the JCSN new connect state machine transitions from the SINGLE NODE state to the BUS RESET state. While in the BUS RESET state, the JCSN asserts the value AB=11 on its newly connected port, forcing a bus reset.

While in the CHILD state, the JCSN asserts a YAMP signal and its speed signal on its newly connected port and restarts the timeout timer. The detection of a value of AB=0Z at the newly connected port causes the JCSN new connect state machine to transition from the CHILD state to the TREED state. The newly connected port may have the value of AB=0Z in response to the JCNN being in the READY state. A timeout may occur such that the state machine goes from the CHILD state to the BUS RESET state if the JCSN does not transition from the CHILD to the TREED state within a predetermined time T2, which may be 100 milliseconds.

The JCSN new connect state machine transitions from the CHILD state to the QUEUED state in response to detecting a value of AB=00 on the newly connected port. The newly connected port may have the value of AB=00 in response to the JCNN being in the QUEUED state. While in the QUEUED state, the JCSN restarts the timeout timer. If the JCSN new connect state machine detects a value of AB=01 on its newly connected port, the JCSN new connect state machine transitions from the QUEUED state back to the CHILD state. If the value on the newly connected port remains at AB=00 for a predetermined time T3, which may be 600 milliseconds, the JCSN new connect state machine transitions from the QUEUED state to the BUS RESET state, and the JCSN forces a bus reset.

While in the TREED state, the JCSN asserts an idle signal having a value of AB=ZZ on its connected port, turns off the speed signal to its parent, and restarts the timeout timer. The reception of a SET__ADDRESS packet causes a transition from the TREED state to the AIDLE state. The AIDLE state signifies that the JCSN has successfully completed the incremental addition process. If a SET__ADDRESS packet is not received within a predetermined time T4, which may be 600 milliseconds, the JCSN new connect state machine transitions from the TREED state to the BUS RESET state, and the JCSN forces a bus reset. Disconnection of the JCSN from the serial bus while the JCSN new connect state machine is in the either the QUEUED state, the CHILD state, or the TREED state causes the JCSN new connect state machine to transition to the SINGLE NODE state.

FIG. 22 shows the JCNN new disconnect state machine, which has the following three states: NET NODE, NOTIFY, and BUS RESET. The NET NODE state is the default state and no actions are taken by the JCNN while in the NET NODE state. If a disconnection is detected on a port that is coupled to a child node, the JCNN transitions from the NET NODE state to the NOTIFY state. If the disconnect is on the port that is coupled to the parent node of the JCNN, the JCNN forces a bus reset.

While in the NOTIFY state, the JCNN makes a fair arbitration request for control of the bus. Upon receiving a bus grant, the JCNN sends a NODE__DISCONNNECTED__ALERT packet. The JCNN disconnect state machine transitions from the NOTIFY state to the NET NODE state once the NODE__DETACHED__ALERT packet is sent.

Now that illustrative embodiments of the incremental configuration process have been discussed with some particularity, a polling mechanism for allowing the bus topology manager of a serial bus to build a topology map for the serial bus without requiring a bus reset is now described. The polling mechanism is useful for most applications of the serial bus wherein it is desirable to reduce bus stalls.

Figure 23:
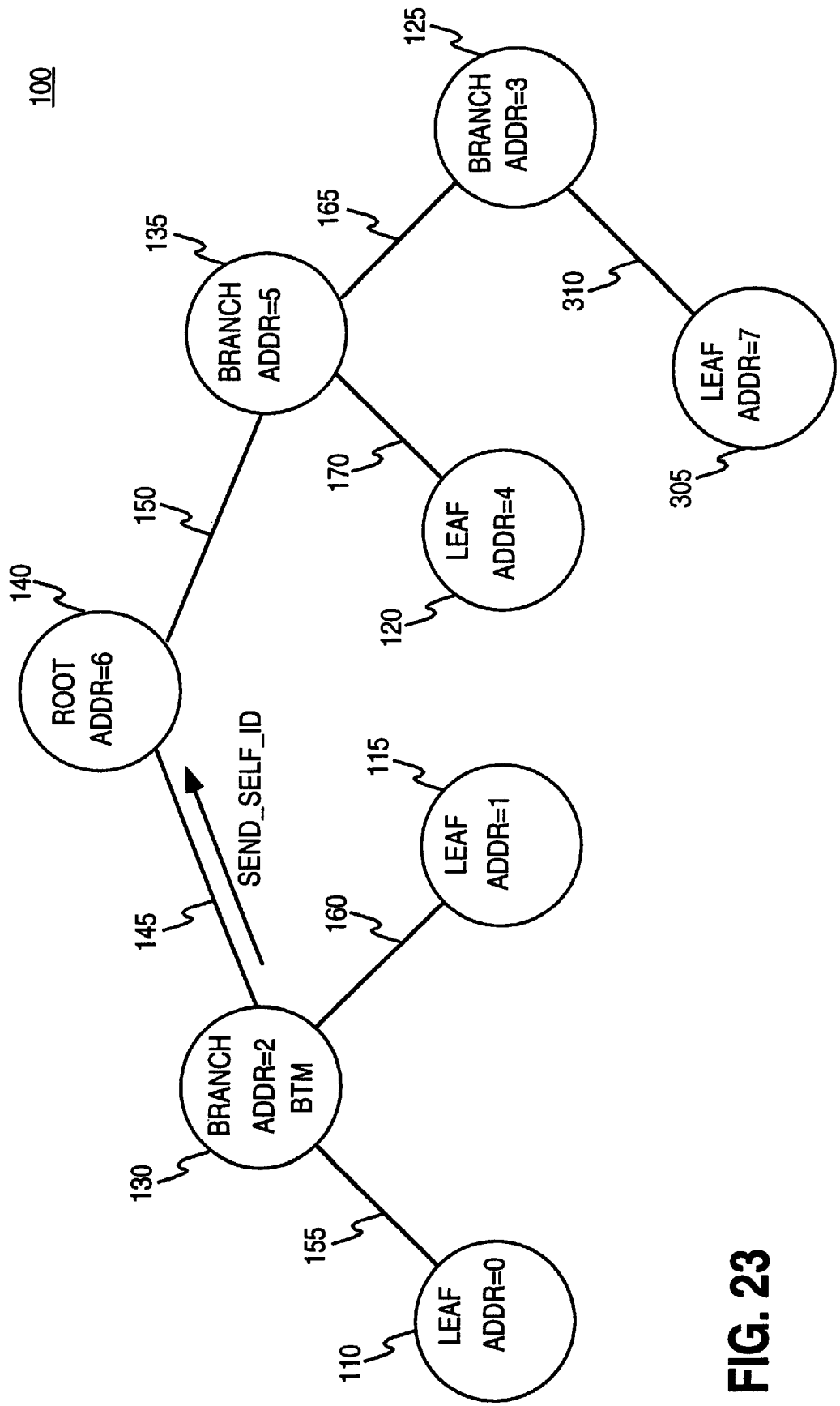
FIG. 23 begins an example of a process for building a topology map without requiring a bus reset.
Figure 24:
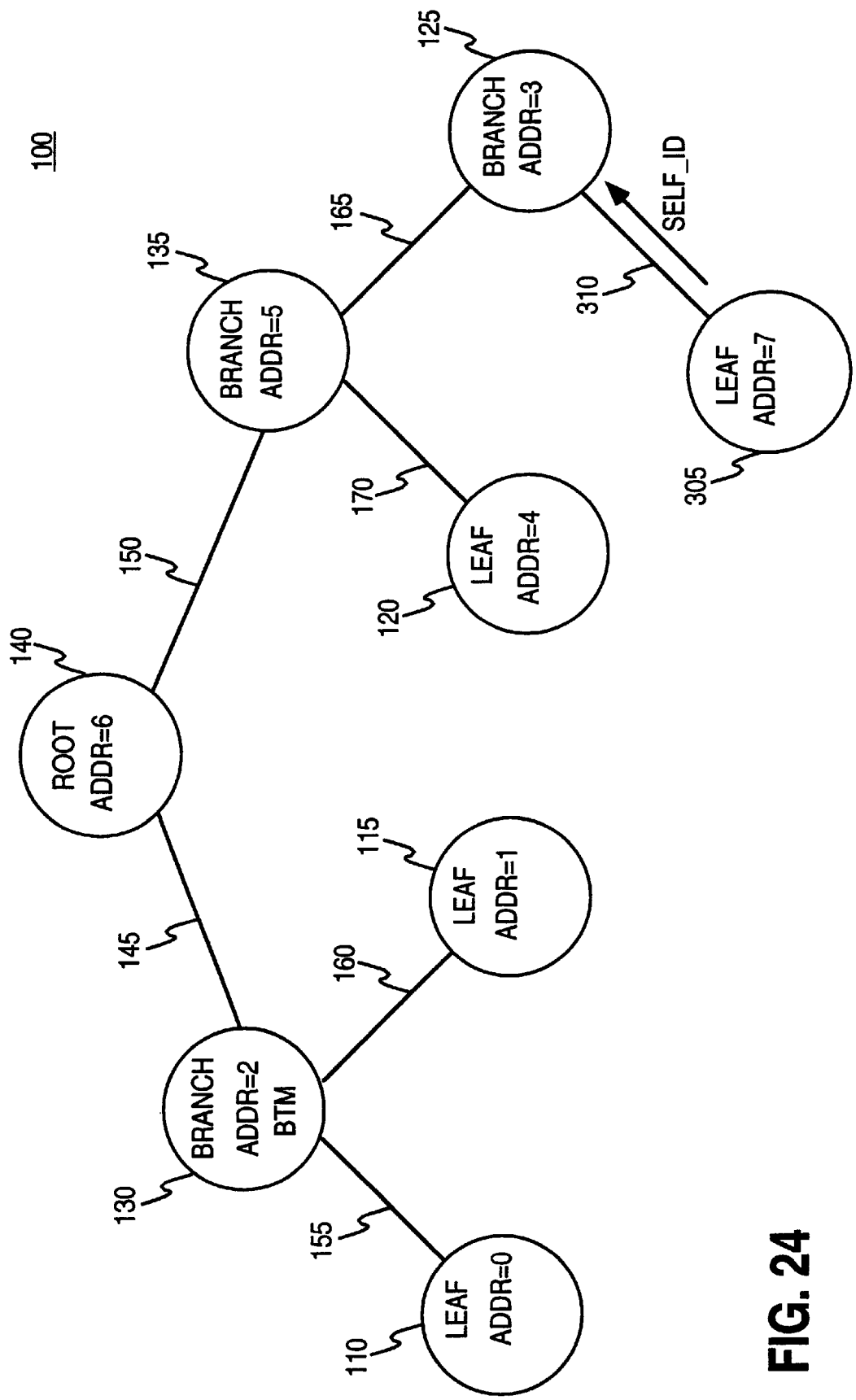
FIG. 24 continues the example of FIG. 23.
Figure 25:
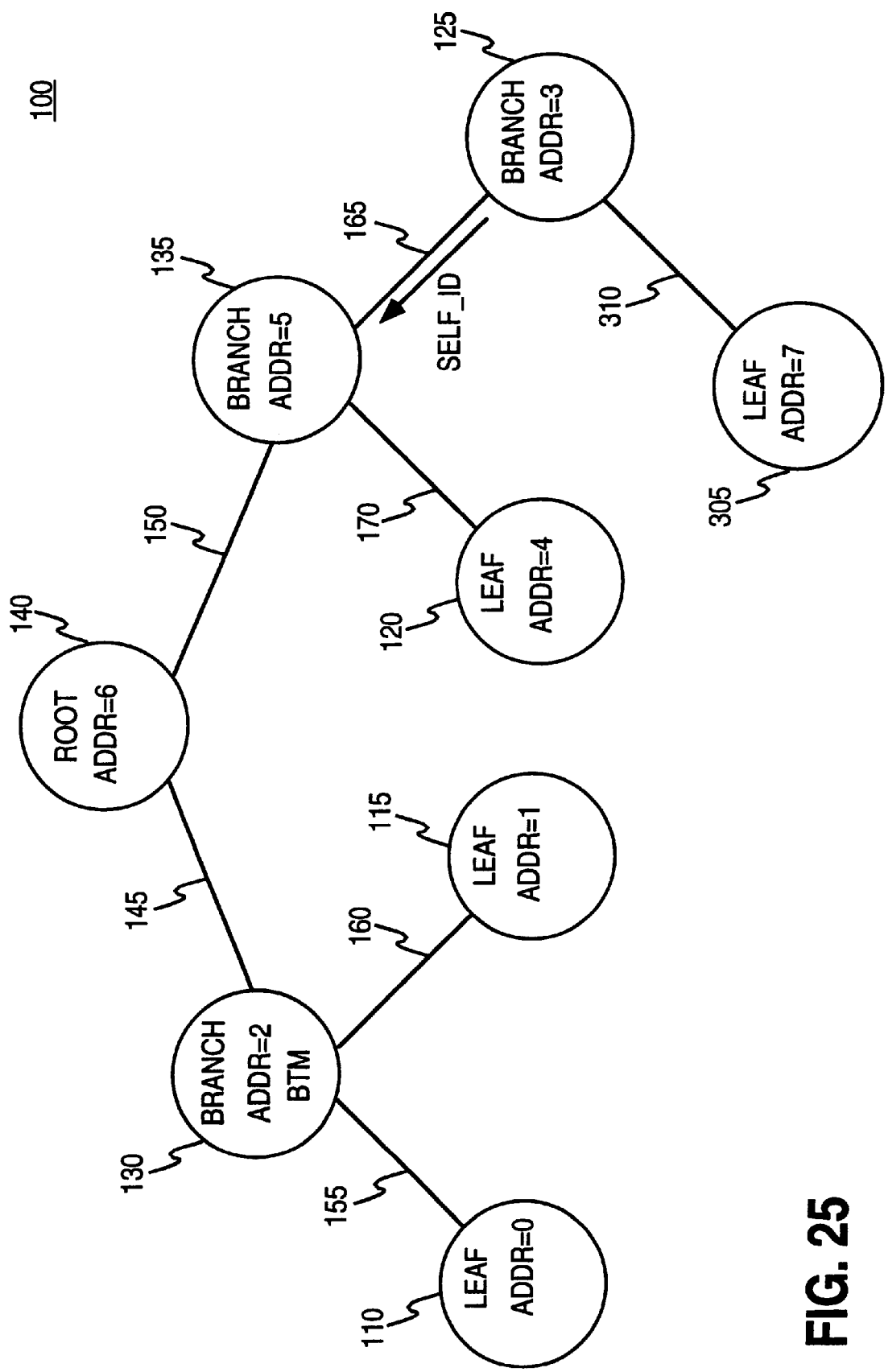
FIG. 25 completes the example of FIG. 23.

The general polling process will now be discussed with respect to FIGS. 23–25. In FIG. 23, the BTM node 130 sends a SEND_SELF_ID broadcast packet, which may be the special PHY configuration packet shown in FIG. 18E. The SEND_SELF_ID packet propagates throughout the entire serial bus. For this example, the SEND_SELF_ID packet specifies node 305 as the target node. As shown in FIG. 24, node 305 sends a self_id packet in response to receiving the SEND_SELF_ID packet. The self_id packet may be identical to the self_id packet specified by the P1394 serial bus standard. The self_id packet of target node 305 is propagated throughout the serial bus such that BTM node 130 receives the self_id packet of target node 305. To provide for complete determination of the connection topology, the parent node 125 sends its own self_id packet after retransmitting the self_id packet of the target node 305. This is shown in FIG. 25. The self_id packet of the target node's parent node propagates throughout the serial bus such that it is received by the BTM node 130.

There are many ways to provide the polling mechanism shown in FIGS. 23–25. Wherein it is desirable to reduce costs associated with providing new circuitry for each node of a serial bus, the polling mechanism may be provided by modifying existing circuitry of the nodes. According to one embodiment, the protocol state machine for each node may be modified.

Figure 26:
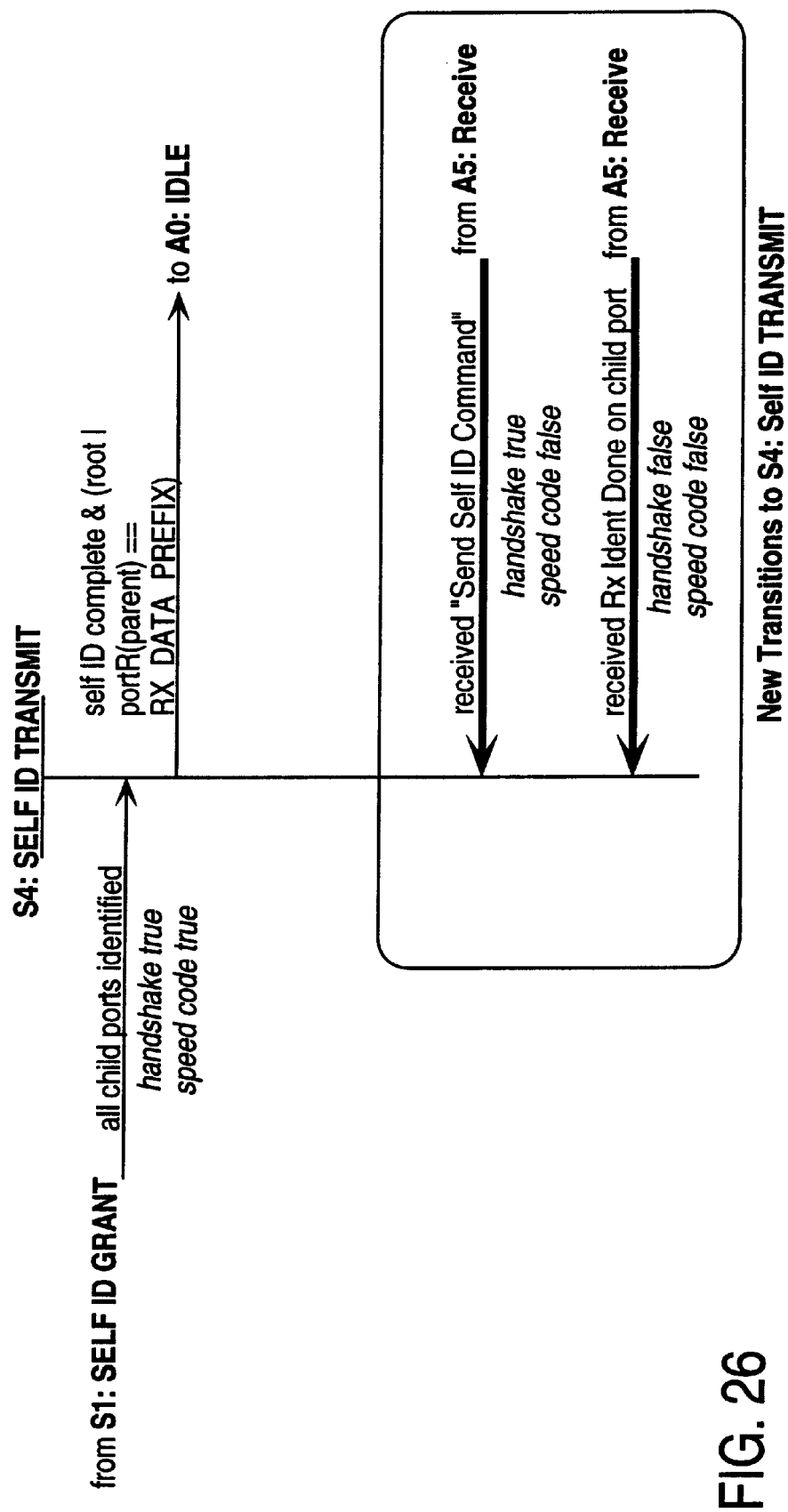
FIG. 26 shows a modified protocol state machine that enables the polling of nodes and sending of self_id packets after the serial bus is configured.

FIG. 26, shows a modified protocol state machine that may be included in each node of the serial bus so that the BTM node may build a topology map without forcing a bus reset. The S4:SELF ID TRANSMIT state shown by FIG. 26 is the final state of self identification phase of the configuration process. During the normal S4:SELF ID TRANSMIT state, a node transmits its self_id packet preceded by a data prefix having a value of AB=01 and followed by a data suffix having a value of AB=10. After transmitting the data suffix of a self-id packet, a node that is transmitting its own self-id packet leaves the A line to its parent node high as a "terminal handshake" signal that indicates to the parent node that the self-id packet comes directly from its child. The parent and child nodes exchange speed capabilities during the handshake signal. The terminal handshake as transmitted by a child node is identified by the P1394 serial bus standard as the tx_ident_done line state.

According to the P1394 serial bus standard, the protocol state machine of a node transitions from a S1:SELF ID GRANT state to the S4:SELF ID TRANSMIT state when all child ports of that node are identified, and the protocol state machine of a node transitions from the S4:SELF ID TRANSMIT state to the A0:IDLE state, which is the beginning state for bus arbitration, when the self_id packet of the node has been transmitted and either the node is the root or the node begins to receive the self_id packet of another node. The P1394 serial bus standard does not provide for a return to the S4:SELF ID TRANSMIT state after arbitration begins other than by performing the bus configuration process in response to a bus reset.

As shown in FIG. 26, two new transitions to the S4:SELF ID TRANSMIT state are specified by the present embodiment. Both transitions begin at the A5:RECEIVE state for the protocol state machine. According to the P1394 serial bus standard, a node receives data from the serial bus while in the A5:RECEIVE state. When a node receives a SEND_SELF_ID packet that specifies that node as the target node, the node transitions from the A5:RECEIVE state to the S5:SELF ID TRANSMIT state and sends its self-id packet complete with subsequent handshake signal to its parent node. Speed signaling may be omitted. The parent node, upon detecting the self-id packet of its child and the terminal handshake signal also transitions from the A5:RECEIVE state to the S5:SELF ID TRANSMIT state and sends its self-id packet without a terminal handshake signal. Again, speed signaling may be omitted. The parent node transmits a tx_datat_prefix signal having a transmitted value of AB=10 to the target node such that it returns to normal arbitration. The parent node also returns to normal arbitration.

The polling mechanism described with reference to FIGS. 23–25 may find utility for other applications, as well. For example, for network management it is necessary to calculate the worst case round trip propagation delay through the serial bus so that the gap count may be set. According to the P1394 serial bus standard, all nodes have a maximum propagation delay, and all cables have a maximum length. Therefore, for a prior serial bus it is sufficient to know the number of nodes in the longest row of the serial bus and to multiply that number by the maximum propagation delays associated with the nodes and cables.

For some cases, it may be desirable to provide arbitrary length cables or nodes having arbitrary propagation delays. Because the maximum propagation delays are no longer known, calculating the worst case propagation round trip propagation delay becomes more complicated, and a new mechanism is needed. The polling mechanism described above may be used to calculate the worst case round trip delay for the serial bus. The BTM node can calculate the actual round trip delay time between it and any other node of the serial bus by simply starting a timer after it sends the SEND_SELF_ID packet and stopping the timer when a SELF_ID packet is received. Calculating the worst case round trip delay then becomes a simple manner of arithmetic.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A node for use in an electronic system interconnect comprising:
   at least one port including a first port operative to transmit and receive data when electrically connected to another node;
   a first circuit coupled to the first port operative to detect when an electrical connection is made between the first port and a second node; and
   a second circuit coupled to the first port operative to detect how many ports are connected to transmit and receive data after the electrical connection is made between the first port and the second node, wherein the node is operative to initiate a new connect handshake with the second node by transmitting a first signal via the first port if the node has more than one connected port, the node being operative to wait for the second node to initiate the new connect handshake by transmitting the first signal to the node if the node has only one connected port, the node transmitting a reset request if the node and the second node contemporaneously assert the first signal, and wherein the node transmits a second signal in response to receiving the first signal, the second signal completing the new connect handshake, thereupon the second node is added to the interconnect without requiring a reset request by the first node, the second node being assigned a bus address after the assumption of a temporary address.

2. The node claimed in claim 1, wherein the node transmits a reset request if the node waits a predetermined time before receiving the first signal from the second node.

3. The node as claimed in claim 1, wherein the interconnect is a serial bus.

* * * * *